(12) United States Patent
Gupta et al.

(10) Patent No.: US 7,280,623 B2
(45) Date of Patent: Oct. 9, 2007

(54) DIGITAL RF CORRELATOR FOR MULTIPURPOSE DIGITAL SIGNAL PROCESSING

(75) Inventors: Deepnarayan Gupta, Hawthorne, NY (US); Oleg A. Mukhanov, Putnam Valley, NY (US); Alan M. Kadin, Irvington, NY (US); Deborah Van Vechten, McLean, VA (US)

(73) Assignees: Hypres, Inc., Elmsford, NY (US); United States of America, Washington, DC (US)

( * ) Notice: Subject to any disclaimer, the term of this patent is extended or adjusted under 35 U.S.C. 154(b) by 719 days.

(21) Appl. No.: 10/210,882

(22) Filed: Aug. 2, 2002

(65) Prior Publication Data

US 2004/0022332 A1     Feb. 5, 2004

(51) Int. Cl.
*H03D 1/00*     (2006.01)
*H04B 1/69*     (2006.01)

(52) U.S. Cl. ........................ 375/343; 375/130

(58) Field of Classification Search ............... 375/343, 375/316, 150, 148, 130; 370/342, 441; 455/259, 455/257
See application file for complete search history.

(56) References Cited

U.S. PATENT DOCUMENTS

| 5,271,034 A | * | 12/1993 | Abaunza ..................... 375/150 |
| 6,266,365 B1 | * | 7/2001 | Wang et al. ................. 375/150 |
| 6,330,273 B1 | * | 12/2001 | Hulbert et al. .............. 375/150 |
| 6,625,434 B1 | * | 9/2003 | Arimitsu et al. ............. 455/259 |
| 7,027,492 B2 | * | 4/2006 | Bertrand et al. ............ 375/148 |
| 2002/0080862 A1 | * | 6/2002 | Ali .............................. 375/148 |
| 2003/0100286 A1 | * | 5/2003 | Severson et al. ........... 455/324 |

FOREIGN PATENT DOCUMENTS

GB     2065421 A  *  6/1981

* cited by examiner

*Primary Examiner*—Khai Tran
(74) *Attorney, Agent, or Firm*—Henry I. Schanzer, Esq.

(57) ABSTRACT

Digital RF correlation based signal processing arrangements allow for the development of software—controlled radio reception without the need for down-conversion to IF frequencies. Various arrangements are implemented using superconducting RSFQ logic enabling the clock and processing speeds required.

65 Claims, 34 Drawing Sheets

DIGITAL RF CORRELATOR FOR MULTIPURPOSE DIGITAL SIGNAL PROCESSING

BACKGROUND

The inventions described herein relate in general to digital receivers for radio frequency (RF) communications. More specifically, the inventions relate to arrangements having a digital correlator operating at RF frequencies that can be used as a basic building block of a multi-function digital receiver that utilizes superconductor technology.

FIG. 1 (Prior Art) is a block diagram of a conventional receiver. Typically, an RF signal from an antenna 100 is coupled to a low noise front end 102 which may provide amplification and/or filtering to isolate a band of frequencies of interest. An output signal from front end 102 is mixed with a local oscillator signal from a local oscillator 106 to move the received RF signal down to an intermediate frequency (IF) that is considerably lower than the RF signal initially received. The IF signal may be filtered by a filter 108. The IF signal is then coupled to a digital post processor 110 to recover the information of interest. The digital post processor 110 may be a demodulator, a deinterleaver, a decoder, a despreader, a dehopper, etc., depending upon the type of signal originally transmitted and to be recovered. For example, in a CDMA cellular telephone receiver the signal of interest may be a so-called 'chip signal'

DETAILED DESCRIPTION

Figure 1:
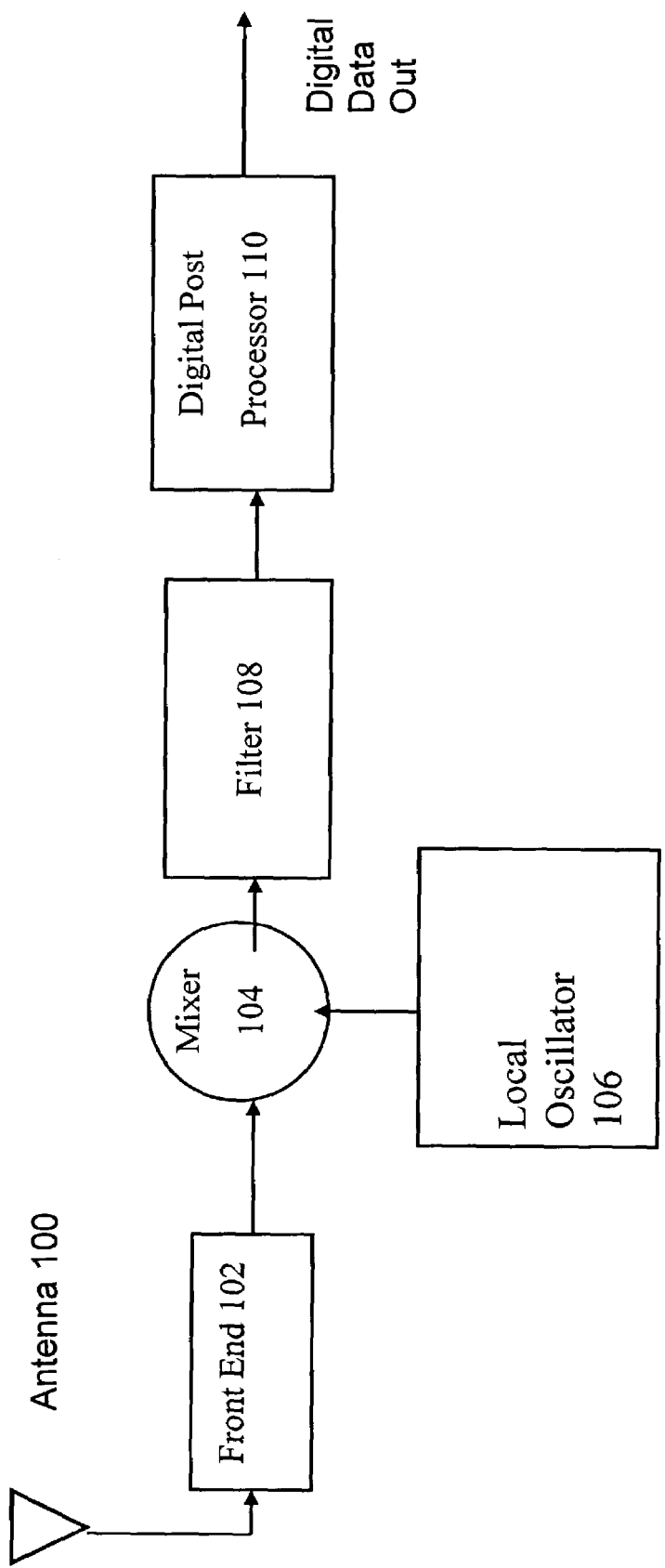
FIG. 1 (Prior Art) is a block diagram of a conventional receiver arrangement.

Referring again to FIG. 1 (Prior Art), the traditional arrangement for a digital data receiver includes mixing a received RF signal down to an IF and then performing digital post processing to recover the signal of interest. Operation at an IF is necessary because of limitations of the state of the art in commonly available semiconductor technology. Semiconductor technology has speed limitations that require it to operate at speeds considerably lower than those required to operate at RF. Digital signal processing functions are performed at relatively low frequencies, well below the frequencies referred to as "RF". RF signals received at the 'front end' of a receiver may be down-converted though one or more intermediate frequency (IF) stages to an IF frequency or baseband, where digital signal processing is carried out at clock rates compatible with the lower frequencies.

Processing wide band RF signals has required the use of multiple channels, which divide the frequency range of interest into manageable intervals. This concept is referred to as "channelization". The division of a wide band signal into channels is typically carried out by analog components using a plurality of mixers to effect frequency down-conversion to multiple bands of frequencies.

The impact of these constraints has been: (a) introduction of additional noise images and other spurs in the received signal due to the multiple stages of down conversion, (b) relative degradation of performance due to the introduction of analog components such as mixers, which are intrinsically non-linear, and amplifiers, (c) absence of functional flexibility or programmability of the receiver due to these analog components and non-existence of a universal remedy for the image/spur problems, (d) additional expense in constructing the system, such as a communications transceiver, due to their application-specific functionality and parts, and (e) intrinsic limitations brought about by the limited processing speed.

Because of hardware limitations, performing correlation directly at RF frequencies using this traditional technology has not been practical. However, as a result of progress in superconducting technology, new receiver circuit arrangements are now possible. The inventions described herein enable digital processing of high speed RF signals when the desired signal is intermixed with many other signals, either of larger amplitude than the desired signal thus reducing it to "noise," or of such a multitude as to essentially "jam" the desired signal by making it difficult to identify it from amongst the others. By using the technique of correlation and implementing it at the high frequency RF stage, significant improvements are realized. It becomes possible to extract signals which would not otherwise be detectable by conventional arrangements. There is a significant reduction in overall system size, cost and complexity of a receiver system. By extracting the desired signal early on, subsequent stages of a receiver are relieved of the burden of performing the same function on a large number of derivative signals obtained by channelizing and downconverting the original signal. The inventions described herein are based in part on the concept of the use of digital correlation at RF frequencies and the application to general digital signal processing. They are also based in part on the concept of a digital receiver for communications applications which combine a digital RF correlator with a high performance wide-band analog to digital converter thereby enabling what is referred to as "true software radio," a system of seamless universal communications where software handles the processing of all different communications protocols, such as CDMA, TDMA, etc., all within the same simple system.

Digital RF correlators and other components (including but not limited to analog to digital converters (ADC) are fabricated from superconductor technology in order to make them sufficiently fast to be able to perform at clock rates compatible with RF. The digital RF correlators are used as building blocks to provide various signal processor and receiver arrangements providing highly flexible receivers that are more universal (types of modulation and frequency bands) than the various semiconductor-based receivers now required to receive the variety of types of signals used for communication. A featured superconductor technology used for the components and arrangements described include the so-called low transition temperature (LTS) technology and Rapid Single Flux Quantum (RSFQ) logic, but is not limited to these particular technologies. It is contemplated that as other superconductor technologies are developed to more practical devices that they too can be utilized to implement the arrangements and methods described herein.

Conventional "digital" receivers are built to receive a specific frequency band and process a specific air interface scheme, e.g. CDMA, TDMA, FDMA, etc. They are able to handle a particular air-interface standard at a particular frequency range and the signals outside of the range are considered to be noise. A typical "digital" receiver is not truly "digital". It typically includes a radio frequency (RF) bandpass filter that passes the received signal in a desired frequency range and attenuates RF energy outside the desired frequency range. The resulting signal is then amplified and down-converted, using analog components, to an intermediate frequency (IF) where it is then digitized by an analog-to-digital converter (ADC) operating at a frequency significantly lower than RF, and processed by an application specific integrated circuit (ASIC).

There is increasing interest in creating wideband digital communication systems. A driving factors for this shift in focus is to a desire to accommodate growth in terms of the number of users and the amount of data being transferred by each user. With the shift in focus there is the realization that with all of the different standards (e.g. IS-95, IS-136, etc.) and with limited RF bandwidth available, it will be difficult to build a universal receiver that is capable of capturing all of the different kinds signals that are sent by various transmitters.

There are numerous air interface standards now in use and new ones continue to be developed. The most recent of these are collectively referred to as third and forth generation (3G and 4G) technologies. These technologies allow for communication among more users with more bandwidth and to do so are utilizing a wideband approach. This approach requires a more efficient utilization of the RF spectrum. Given the plurality of different air interface standards it has become desirable to design a receiver that is capable of processing signals of various air-interface standards rather than only a specific one of them.

It is believed that a software solution to this problem is more viable than a hardware solution since it is more versatile and less complex. This saving in complexity translates to a cheaper operating cost for providers and users of the system. One approach to solve this problem is to implement a software defined radio (SDR).

An SDR receives an analog signal and digitizes it. The digitized signal is then processed by a software programmable digital signal processor (DSP). Several SDR approaches have been proposed. One approach is to build a flexible RF front-end that is capable of handling all of the different standards and provide the baseband signal for each. Another proposed solution is to sample and digitize the analog signal directly from the antenna.

Proposed solutions in the past have been theoretically viable. however, there were fundamental problems that have blocked successful development of an SDR. One such problem was the ability to digitize an analog signal at RF. The required sampling frequencies for an analog to digital converter are too high. For example, to digitize a signal with a 2 GHz. carrier frequency requires a minimum sampling rate of 4 GHz. according to the Nyquist sampling theorem. It is actually desirable to oversample the signals to reduce the effects of noise. The higher the sampling frequency is above the Nyquist rate of sampling the larger the bandwidth of the power spectrum of the noise will be, hence reducing the power of the noise in the frequency range of interest. Thus, in our example, above, the sampling rate would advantageously be even greater than 4 GHz. Sampling at such rates has been impossible using semiconductor technologies.

The inventions described herein are based in part on the use of superconductor technology to overcome the limitations of semiconductor technology. They are also based in part on new concepts for digital signal processing using correlators to perform digital signal processing directly at RF. The arrangements presented herein enable a new generation of digital receivers for use with commercial and military communication systems.

An analog signal received by an antenna is immediately digitized without any down-conversion. Digital signal processing is carried out under software control. Without the need for down-conversions, receivers can be built so as to be 'universal' because of their flexibility. The frequency and modulation specific hardware (analog down conversion, band specific filters, and other air interface specific schemes currently being performed early in the receiver chain of conventional receivers) can be eliminated. A single receiver can be adapted to receive various frequencies and modulation types by software reprogramming. This flexibility, enabled by the absence of down-conversions, allows receivers to be 'universal'. For example, a plurality of digital reference waveform templates corresponding to various types of signals of interest are stored and made available. These templates are compared with a received RF signal received using a digital RF correlator.

This approach provides an easy and effective scheme for processing existing and future modulation schemes and signal types. It reduces inefficiencies inherent in the present allocation of the RF spectrum. This is made possible by utilizing an ADC that is capable of accurately digitizing signals in the RF spectrum.

State of the art semiconductor devices are capable of providing a dynamic range on the order of a few MHz. Thus direct digital conversion is viable for some communication arrangements but is not viable universally. A universal SDR solution is not possible using state of the art semiconductor devices. For a universal solution at frequencies used today, a bandwidth of a few gigahertz is required at a minimum. State of the art semiconductor technology is simply insufficient for this purpose.

A key component of a SDR arrangement is the digital RF correlator for multipurpose digital signal processing described in this document. The inventions described and/or claimed herein enable digital processing of high speed RF signals when the desired signal is intermixed with many other signals, either of larger amplitude than the desired signal thus reducing it to "noise," or of such a multitude as to essentially "jam" the desired signal by making it difficult to identify it from amongst the others. Implementing correlation at the high frequency RF stage of a receiver realizes significant improvements enabling a) extraction of signals which would not otherwise be detectable by any other conventional means, and b) significant reduction in the overall system size, cost, and complexity, by extracting the desired signal early on, thus relieving subsequent stages from the burden of performing the same function on a large number of derivative signals obtained by channelizing and down-converting the original signal.

The SDR solutions to which the claimed inventions are directed include two major components: a) digital RF correlator that is useful to general digital signal processing, b) a wide-band analog-to-digital converter and other receiver components combined into various receiver configurations to enable what is referred to as "true software defined radio (SDR)," a system of seamless universal communications wherein software handles the processing of all different communications protocols, such as CDMA, TDMA, etc., all within a 'universal' hardware system.

Figure 2:
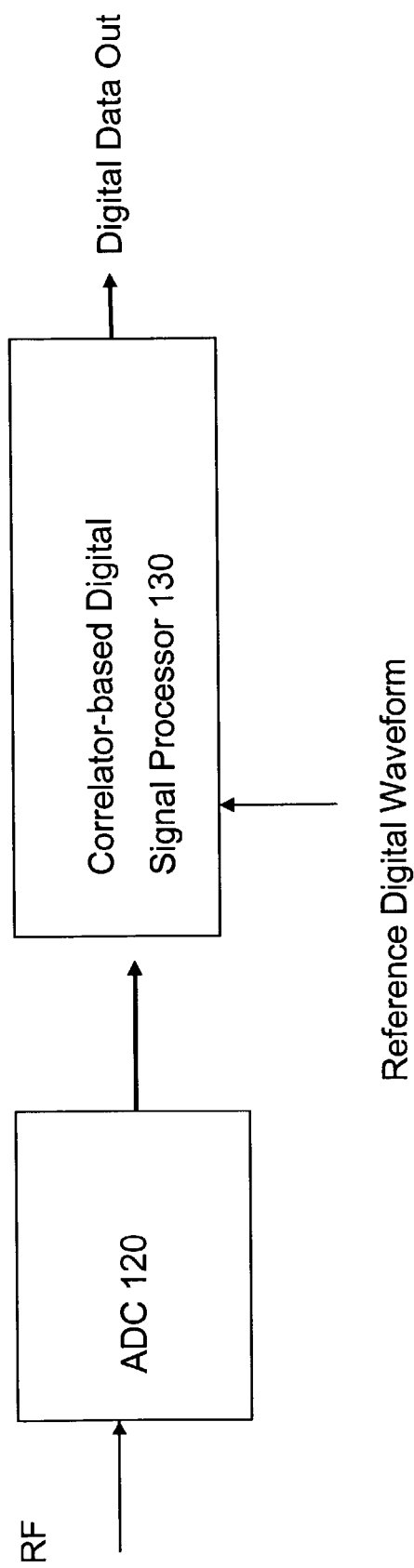
FIG. 2 is a block diagram of an RF correlator-based receiver arrangement.

FIG. 2 is a block diagram of an RF correlator based receiver arrangement. An RF signal (such as from an antenna 100, or other external source) is input to an analog to digital converter (ADC) 120 operating at RF. ADC 120, fabricated from superconductor elements, samples the incoming RF signal and provides a digital data stream to a correlator-based digital signal processor (CBDSP) 130. In the most basic arrangement, ADC 120 acts as a quantizer and produces a 1-bit data stream. We will use as an example a 1-bit data stream at 20 GHz.

The inventions herein are not limited to the use of a 1-bit data stream however. For particular applications, it may be desirable to provide a multi-bit data stream from ADC 120. One way to provide such a multi-bit data stream is to filter the output of ADC 120. Other arrangements are possible. The particular form and arrangement of ADC 120 and CBDSP 130 can be different depending on design requirements.

CBDSP 130 correlates the data stream from ADC 120 with a reference digital waveform (perhaps one of many stored in memory and made available under software control) and provides a digital data output which represents the signal of interest to be received.

In the case of a 1-bit data stream from ADC 120 (acting as a quantizer), the output of ADC 120 would be correlated with a reference digital waveform that is also a 1-bit digital data stream. The reference template would have a clock rate that is the same as that of ADC 120. If ADC 120 provided a 1-bit data stream at fclk 20 GHz, the reference digital waveform would likewise be clocked into the correlator at fclk 20 GHz. Thus, in this most 'elegant' 1-bit data stream example, ADC 120 provides a 1-bit data stream and correlator 130 correlates that 1-bit data stream with a 1-bit data stream reference digital template. A 1-bit data stream is the easiest arrangement to implement using current RSFQ logic fabrication techniques. However, the inventions described herein are not limited to 1-bit data streams. Multi-bit stream embodiments are practical even though more complicated to fabricate.

CBDSP 130 provides a digital output representing the signal of interest to be received. For example, the digital output could be the so-called "chip" signals from a CDMA cellular system, some other spread spectrum chip signals or the like. The arrangements described herein are useful with various types of modulation, for examples, delta code and delta-sigma code, binary phase shift keying (BPSK), quadrature phase shift keying (QPSK) multiple phase shift keying (MPSK), etc.

Figure 3:
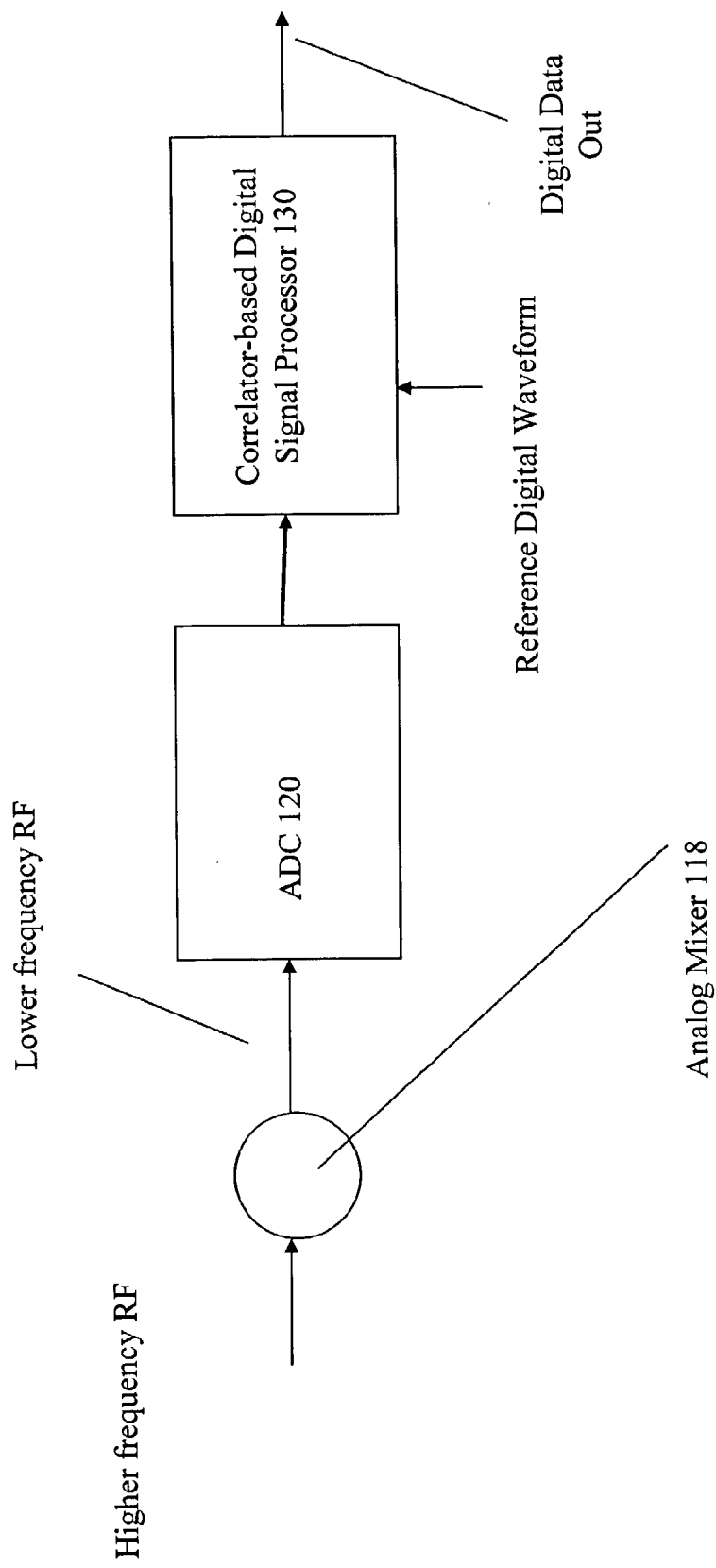
FIG. 3 is a block diagram of an RF correlator-based receiver arrangement in which a higher frequency input RF signal is mixed to a lower frequency RF signal before being correlated.

An alternative RF correlator receiver arrangement is shown in FIG. 3. In the FIG. 3 arrangement, instead of directly correlating a received RF signal, a high frequency RF signal can be mixed by an analog mixer 118 to a lower frequency, but still RF signal. The RF signal from mixer 118 is correlated with a reference digital waveform template to detect the signal of interest.

Matched Filter

Figure 4:
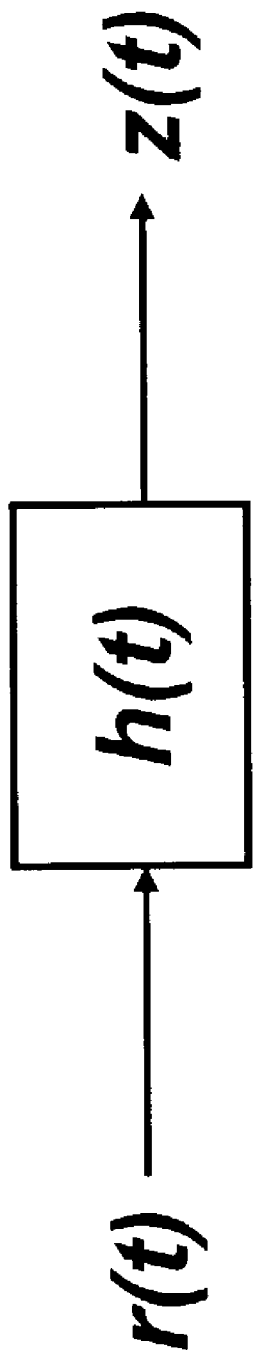
FIG. 4 illustrates the principle of a correlator used as a matched filter.

CBSDP 130 can be thought of as behaving as a matched filter. A basic concept of communication theory is that it is easiest to detect a signal if you know exactly what that signal looks like and you can build a receiver that matches the signal to be received. The use of a correlator is one way to effectively produce a matched filter. FIG. 4 is a block diagram explaining the concept of a matched filter.

FIG. 4 illustrates the principle of a correlator used as a matched filter. The impulse response h(t) of a matched filter for a message signal s(t) of duration T is $$h(t) = \begin{cases} ks(T-t) & 0 \le t \le T \\ 0 & \text{elsewhere} \end{cases} \quad \text{(Equation 1)}$$

Since the output z(t) of a causal filter is the convolution of the received input waveform r(t) and the impulse response h(t) of the filter, it can be written as $$z(t) = \int_0^t r(\tau)h(t-\tau)d\tau = \int_0^t r(\tau)s(T-t+\tau)d\tau \quad \text{(Equation 2)}$$

by arbitrarily setting the constant of proportionality (k) in (1) to unity. At t=T, the matched filter output takes the form, $$z(T) = \int_0^T r(\tau)s(\tau)d\tau, \quad \text{(Equation 3)}$$

which is identical to the product integration or correlation of the received signal r(t) with a replica of the transmitted waveform s(t) over the symbol interval (T).

Correlation is performed in the digital domain by multiplying the digitized received waveform with a waveform template, and then performing digital integration of the product using a counter. For 1-bit digital correlator, the bit-multiplication function can be implemented using a bit-XOR (exclusive-OR) function, a relatively simple logic configuration.

Principle of Operation of Digital-RF Correlator

The following further explains the principles of operation of a digital RF correlator. In spread-spectrum communication, each information (data) bit is first coded for error correction, and then spread by representing each coded symbol with a set of pseudonoise (PN) chips. For transmission, an RF carrier is digitally modulated (by various phase-shift, frequency-shift, and amplitude shift keying techniques) with these PN chips. The modulated carrier is amplified and transmitted. At a receiver, the modulated carrier is received, down-converted to an intermediate frequency (IF) signal. This IF signal is demodulated to reproduce the PN chips. The PN chips are then correlated to recover the information bits.

In contrast, we receive the RF waveform and correlate the RF waveform itself rather than perform correlation on the demodulated digital waveform (chips). Our correlator works at a high speed sampling clock rate (about 20 GHz).

The received RF waveform is correlated with a locally generated waveform template. This template must be synchronous in phase with the received waveform. To achieve this phase synchronization, we use a feedback arrangement including a pair of correlators phase shifted by π/2. If the two waveforms—the received waveform and the resident template—are in phase, one of the correlators (in-phase) will produce a maximum signal while the other (quadrature) produces a minimum. Phase synchronization is achieved and maintained by maintaining the quadrature correlator output at a minimum by advancing or retarding the phase of the locally generated waveform template. In the digital domain, the phase adjustments are achieved in discrete time steps, corresponding to single clock periods. A common 20-GHz clock source can serve as the ADC sampling clock and the correlator clock. The number of required correlator channels depends on the symbol constellation of digital modulation scheme (e.g. 4 for QPSK, 16 for 16-PSK etc.).

Figure 5:
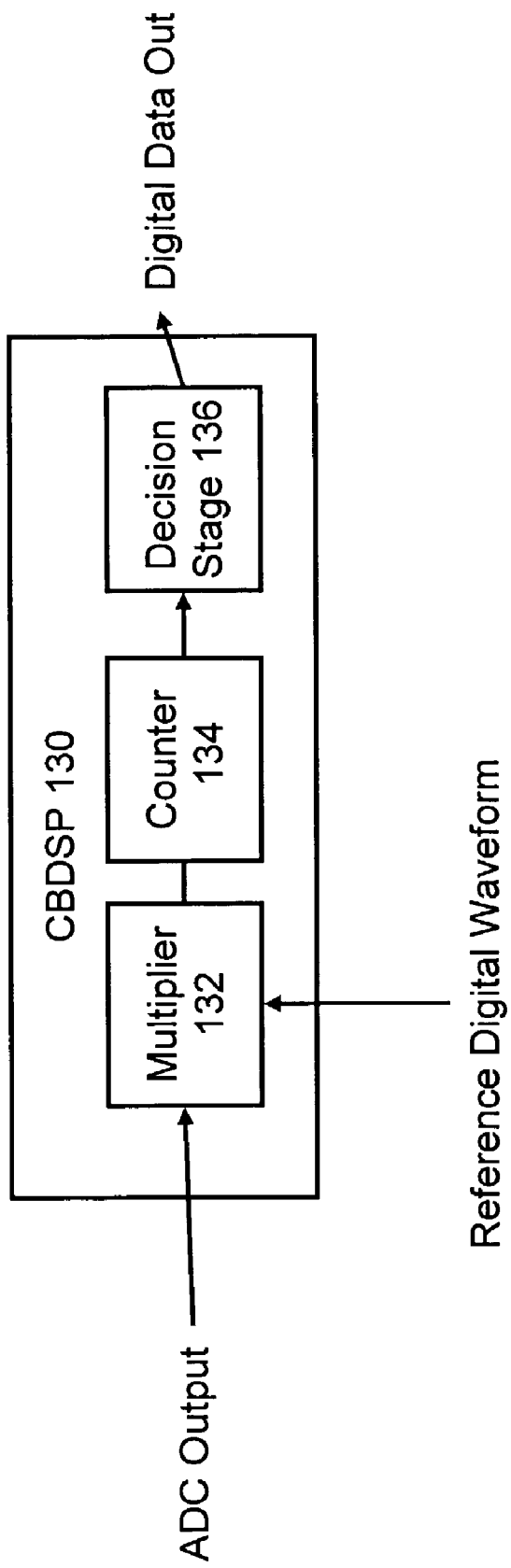
FIG. 5 is a more detailed block diagram of a digital RF correlator.

FIG. 5 is a more detailed schematic diagram of CBDSP 130. A correlator multiplies two waveforms to be correlated and integrates (adds) the product over a period of time, resulting in a correlation sum. The correlation sum provides a measure of how closely the two waveforms match each other over the integration time interval (a large sum indicates a high degree of agreement or "correlation"). A correlator can be used as a building block to produce other components, such as a matched filter, which is a linear filter designed to provide a maximum signal-to-noise ratio at its output for a given transmitted symbol waveform (the filter is matched to the transmitted symbol waveform).

CBDSP 130 includes a multiplier 132, a counter 134 and a decision stage 136. Output from ADC 120 (FIGS. 2 and 2A) is coupled to one input of multiplier 132. Multiplier 132 can be a relatively simple configuration, such as an XOR gate configuration or it can have a more complicated configuration. A locally generated reference digital waveform is coupled to the other input of multiplier 132. The output of multiplier 132 is coupled to the input of counter 134, which counts the multiplied result for a predetermined period of time. After the predetermined count period, the output count of counter 134 is delivered to decision stage 136 which compares the count to predetermined standards to decide as to each bit of data whether there is correlation or not.

In essence ADC 120 (FIGS. 2 and 2A) and CBDSP 130 operating at RF frequencies are be combined to replace the traditional front end, down-conversion and signal processing of a traditional receiver arrangement, such as shown generally in FIG. 1 (Prior Art). For the simple case in which ADC 120 provides a 1-bit data stream, it is acting as an oversampled quantizer. Thus, a 1-bit data stream (for example, 1-bit digital data at fclk=20 GHz.) from ADC 120 is correlated with a 1-bit digital waveform template (for example, 1-bit digital data at fclk=20 GHz.). This arrangement can be used with any form of signal to be received and is compatible with various codes, such as delta sigma or delta code. The type of modulated signal to be received dictates whether a 1-bit correlator or multi-bit correlator arrangement would be appropriate. For example, a delta sigma modulator produces a 1-bit digital code output from the modulator. Such a signal can be filtered to obtain a multi-bit output. Delta code, on the other hand, is not proportional to the signal, but rather is proportional to its derivative. In essence, a delta code modulator digitizes the change of a signal of interest. In such a case, you must integrate in the digital domain using an accumulator to get the appropriate output.

The second input to the multiplier is a locally produced digital template with which to correlate the received signal. This template is synthesized in advance and stored locally, ready to be clocked into the multiplier at the appropriate clock rate.

In the case of a 1-bit data stream from ADC 120, the multiplier can be implemented as a single XOR gate. An advantage of this design is that an XOR gate is relatively easy to fabricate in superconductor technology. For a multi-bit data stream from the ADC, a more complicated arrangement is necessary. For example, you can correlate an n-bit ADC output with a m-bit reference utilizing an n×m multiplier, which in general is more complicated than a simple XOR gate arrangement.

There is an intermediate case of interest that is of greater complexity than the 1-bit data stream case, but not as complex as correlating an n-bit ADC output with an m-bit reference. If one data stream is multi-bit (k-bit) but the other is a single bit stream, a k×1 multiplier can be used. Although a k×1 multiplier is not as simple as 1×1 multiplier, it is far less complex to implement than a full m×n multiplier. The multiplier would has to be able to multiply 5-bit numbers and is therefore considerably more complex in configuration. Such multi-bit multiplication is more difficult to implement using RSFQ logic.

The output of the multiplier is coupled to a counter which accumulates a count of the multiplication result over a predetermined period of time. If the incoming signal from the ADC data stream and template are perfectly correlated, the multiplication result is a "1".

It is presently preferred that ADC 120 and CBDSP 130 be fabricated from the rapid single flux quantum (RSFQ) logic family. However, the inventors recognize that it may be possible to fabricate the various embodiments from other technology logic families.

The decision making circuit in its most basic form, makes a three level decision, such as, for example:

uncorrelated=+1 correlated=0 anticorrelated=−1 (compared signals are complementary)

The following is an example of a decision circuit design. One could define a count space of 0 to 4096. A count from the counter of 2048 corresponds to 'uncorrelated'. A count from the counter of 2048+/−200 would be considered to be an uncorrelated result.

Figure 6:
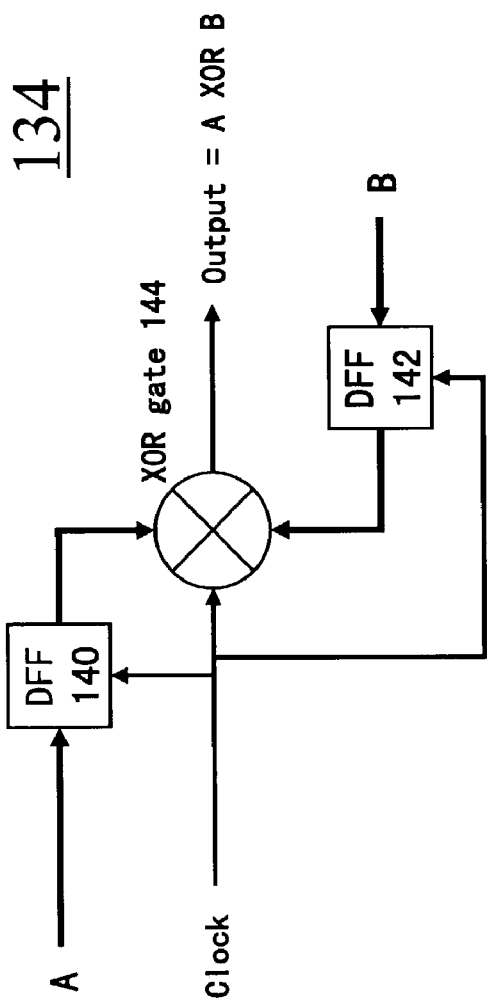
FIG. 6 is a schematic diagram of a 1-bit clocked cross-correlator.

FIG. 6 is a schematic diagram of a 1-bit clocked cross-correlator 134 suitable for use as CBDSP 130 shown in prior figures. It is an example of a possible implementation of CBDSP 130 and is not the only possible implementation. Signals A and B to be correlated are coupled to inputs of respective D-type flip flops (DFF) 140 and 142. The respective outputs of the DFFs are coupled to respective inputs of an XOR gate 144 which provides an output equal to A XOR B. XOR gate performs the equivalent of multiplication for a 1-bit data stream.

Figure 7:
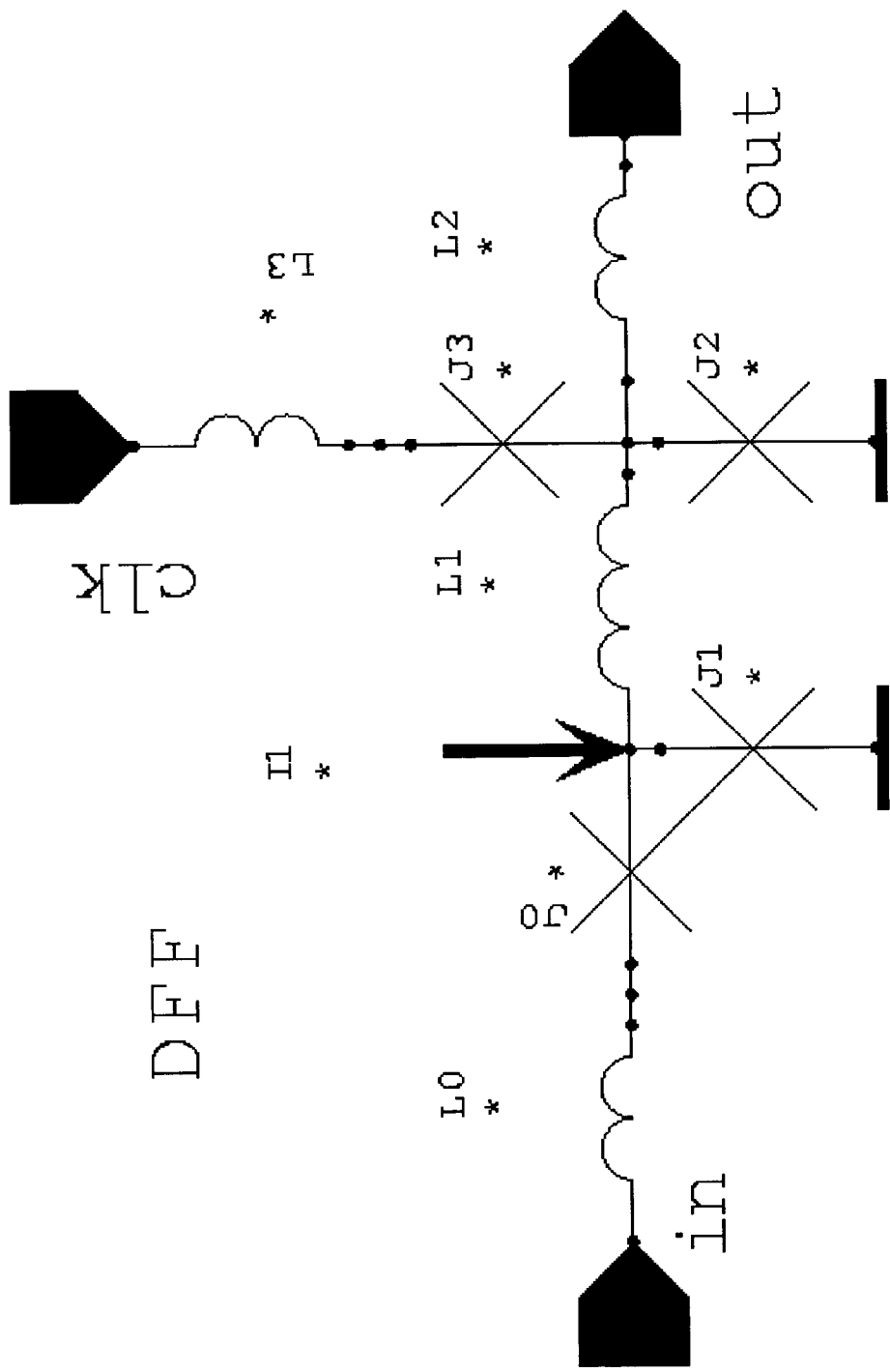
FIG. 7 is a schematic diagram of D-Flip Flops 140, 142 shown as a block in FIG. 6 and fabricated from RSFQ logic.

FIG. 7 is a schematic diagram of a DFF such as DFFs 140 and 142 (FIG. 6) implemented in RSFQ logic. This basic latch is also known as RS (reset-set) flip-flop. It is build around a DC SQUID J1-L1-J2 which has two stable states: "1" and "0", i.e. with and without a magnetic flux quantum inside. In state "0", an SFQ voltage pulse applied to the input "in" enters the SQUID through junction J1 and is stored inside. In state "1" the dc current in the quantizing loop flows clockwise and as a result the junction J1 is biased very far from its critical current value. If another SFQ pulse applied to the input "in", it flips the junction J0 and the latch remains in state "1". If, instead, we apply an SFQ pulse to the "clk" input when the latch is in state "1", the junction J2 would flip, releasing the stored flux quantum and thus clearing the quantizing loop. In state "0" junction J3 is closer than J2 to its threshold value and an SFQ pulse "clk" flips J3, so that the latch remains in state "0". For a clocked operation in a bigger design, when all inputs arrive from previous stages (as in a shift register) junction J0 is not necessary.

Figure 8:
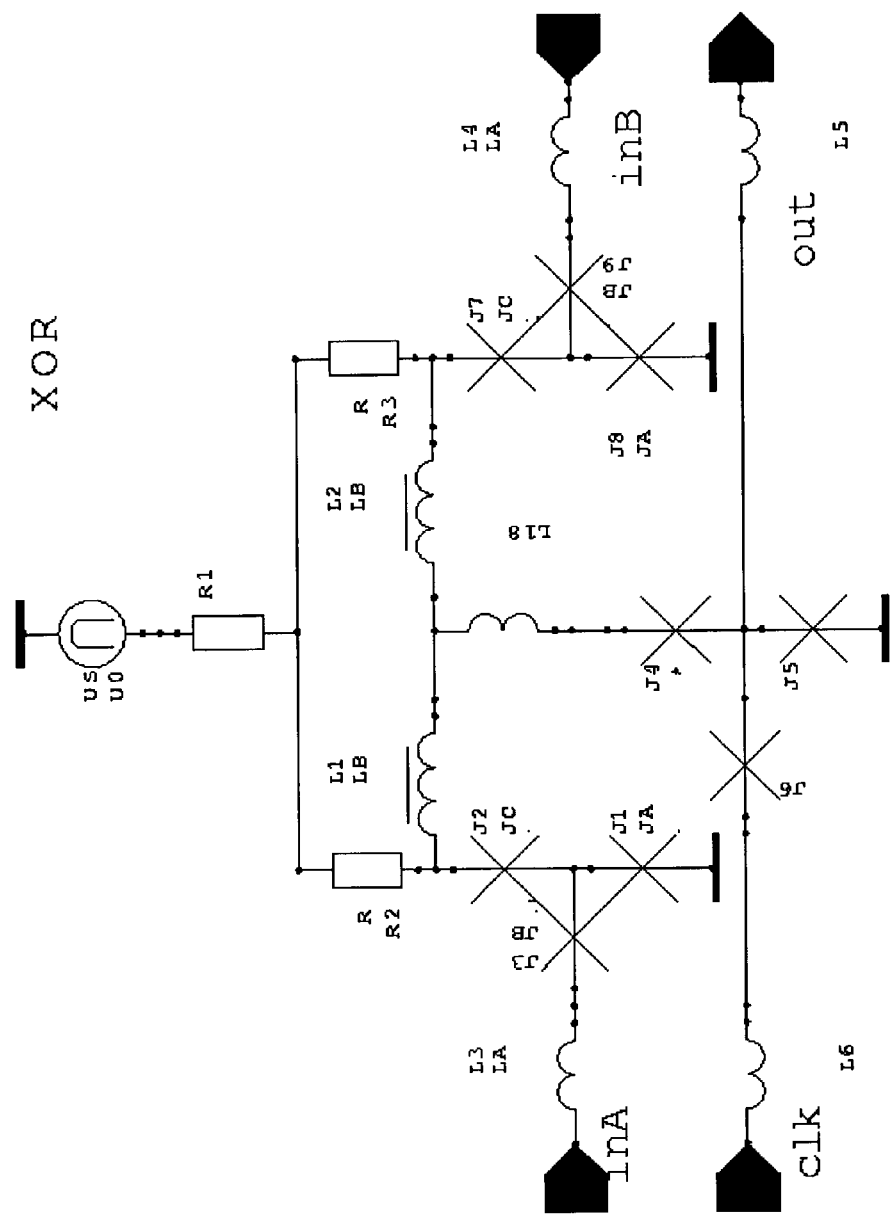
FIG. 8 is a schematic diagram of a XOR gate 144 shown as a block in FIG. 6 and fabricated from RSFQ logic.

FIG. 8 is a schematic diagram of XOR gate 144 (FIG. 6) implemented in RSFQ logic. An input SFQ pulse "A" ("inA") enters through junction J1 and is stored in the quantizing loop J1-J2-L1-L18-J4-J5, or loop "A". Similarly, an SFQ pulse applied to input "B" ("inB") enters through junction J8 and is stored in loop "B": J8-J7-L2-L18-J4-J5. When both loop "A" and loop "B" are empty, the incoming clock pulse "CLOCK" ("clk") induces a 2*Pi phase leap injunction J6 and there is no output. We have, therefore, the 0+0=0 function (here "+" stands for modulo 2 addition operator, or XOR). When there was only input pulse before the clock, the current through the quantizing inductance of one of the loops biases the two-junction comparator J4-J5 so that the next clock pulse flips junction J5 (rather than J6) and we get and SFQ pulse at the output of the XOR. In other words, we have 1+0=0+1=1. The output SFQ voltage pulse across J5 clears the loop which contained the flux quantum and is at the same time applied to the empty loop. This is why the buffer junctions J2 and J7 are necessary. They prevent junctions J1 and J8 from flipping (and thus injecting parasitic backward-moving SFQ pulses into the input circuits) when the output pulse is generated. The slowest and most untrivial operation is 1+1=0. It is performed by junction J4 which flips when both quantizing loops have and SFQ inside. This process starts asynchronously, as soon as both "A" and "B" are in and has to finish before the arrival of the clock signal. Ideally, when the clock pulse arrives, it finds the gate in the same state as in the case of zero inputs. Junctions J3 and J9 are optional, they serve as buffers in case 2 "A"s or 2 "B"'s arrive before the clock pulse.

Figure 9:
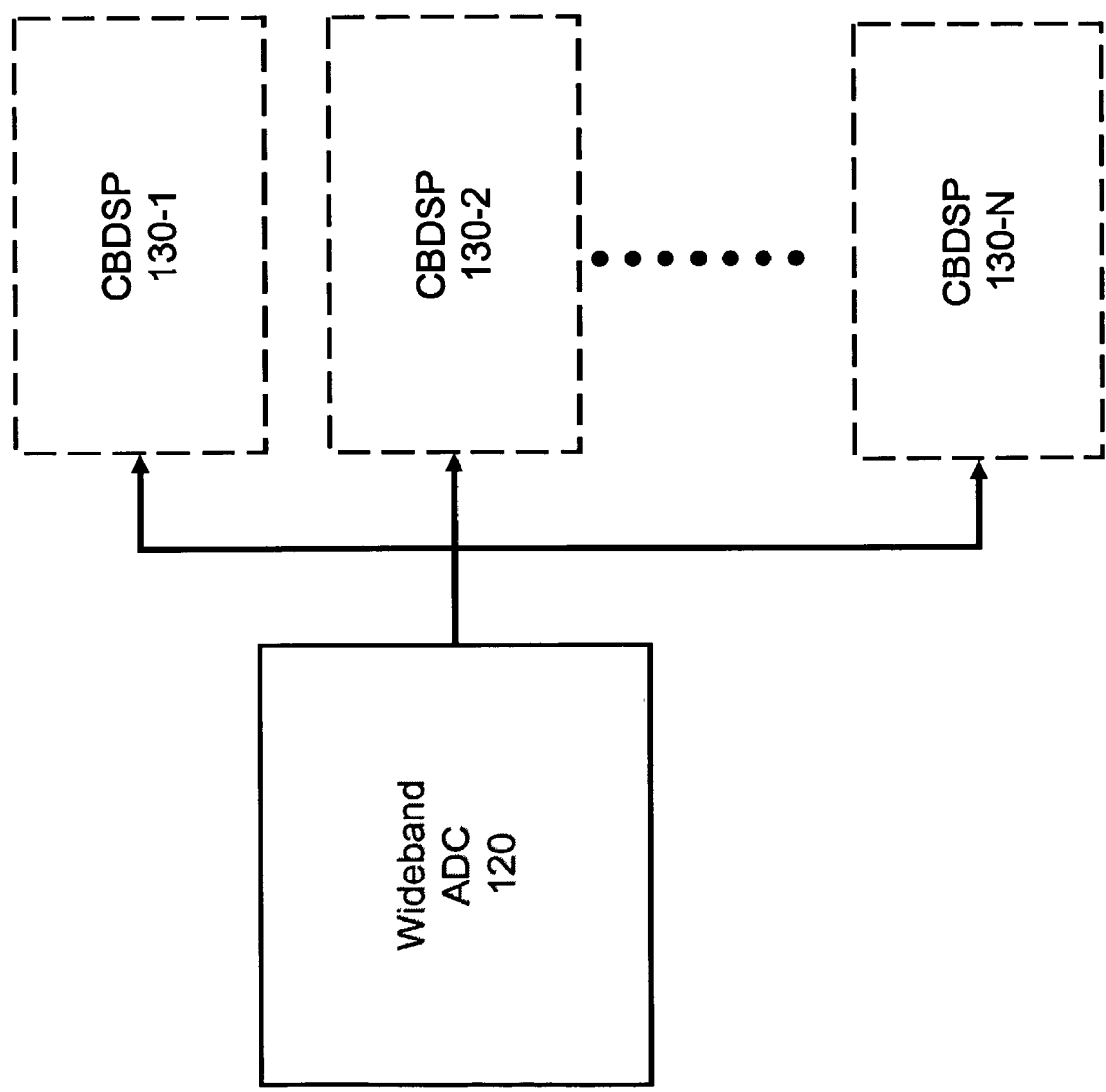
FIG. 9 is a block diagram of an RF correlator based receiver showing how digital processing allows multiple DSPs per channel.

The latch was optimized with inputs and output matched with special JTLs:

FIG. 9 is a block diagram of a receiver arrangement utilizing multiple CBDSPs 130. An RF signal from a wideband ADC 120 can be replicated and applied to multiple CBDSPs 130-1, 130-2 . . . 130-N for simultaneous digital signal processing. An advantage of processing in the digital domain is that copies can be made without loss of signal quality. The digital output of the ADC can be simultaneously applied to multiple correlation-based digital processing circuits, each correlating the digitized input against a different reference waveform. One application of this is a channelizing receiver, where a broadband input, comprising multiple narrow sub-bands can be simultaneously received with a high dynamic range ADC front-end and channelized in the digital domain. Each channel can be have a programmable band location and width that can be controlled by using appropriate correlation template.

Figure 10:
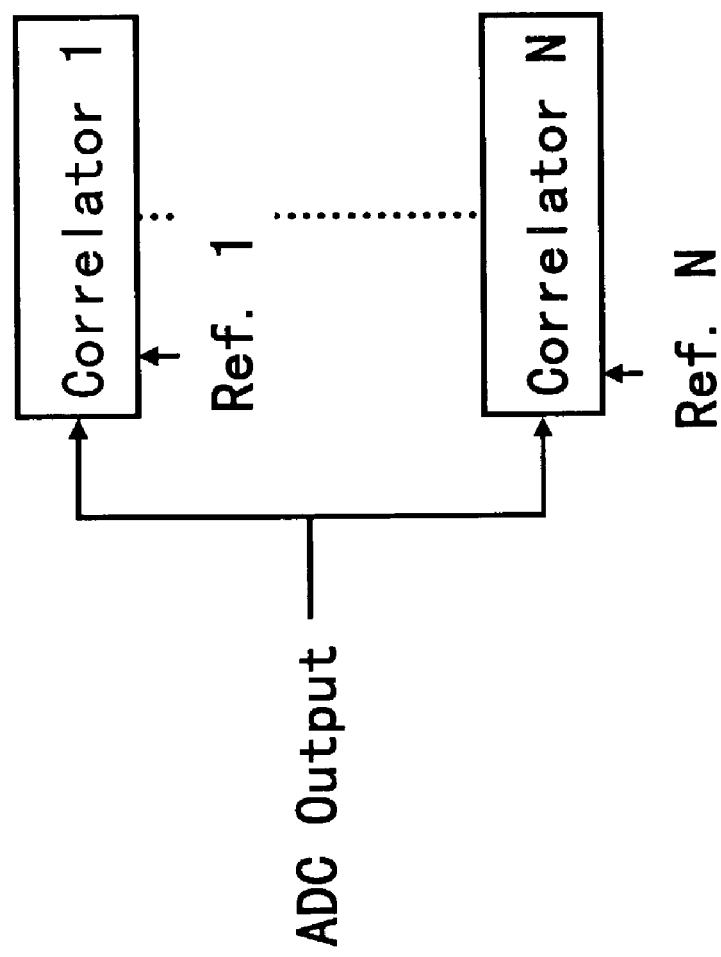
FIG. 10 is a schematic diagram showing an RF correlator based receiver arrangement having a plurality of correlators for comparing replicas of an ADC output signal with multiple reference waveforms.

FIG. 10 is a schematic diagram showing an RF correlator based receiver arrangement having a plurality of correlators for comparing replicas of an ADC output signal with multiple reference waveforms. It is possible to replicate the output of an ADC such as ADC 120 (see FIG. 2) and apply it to multiple channels each constituted by a correlator. Thus, the ADC output can be compared simultaneously with the same or with different reference digital waveform templates.

Figure 11:
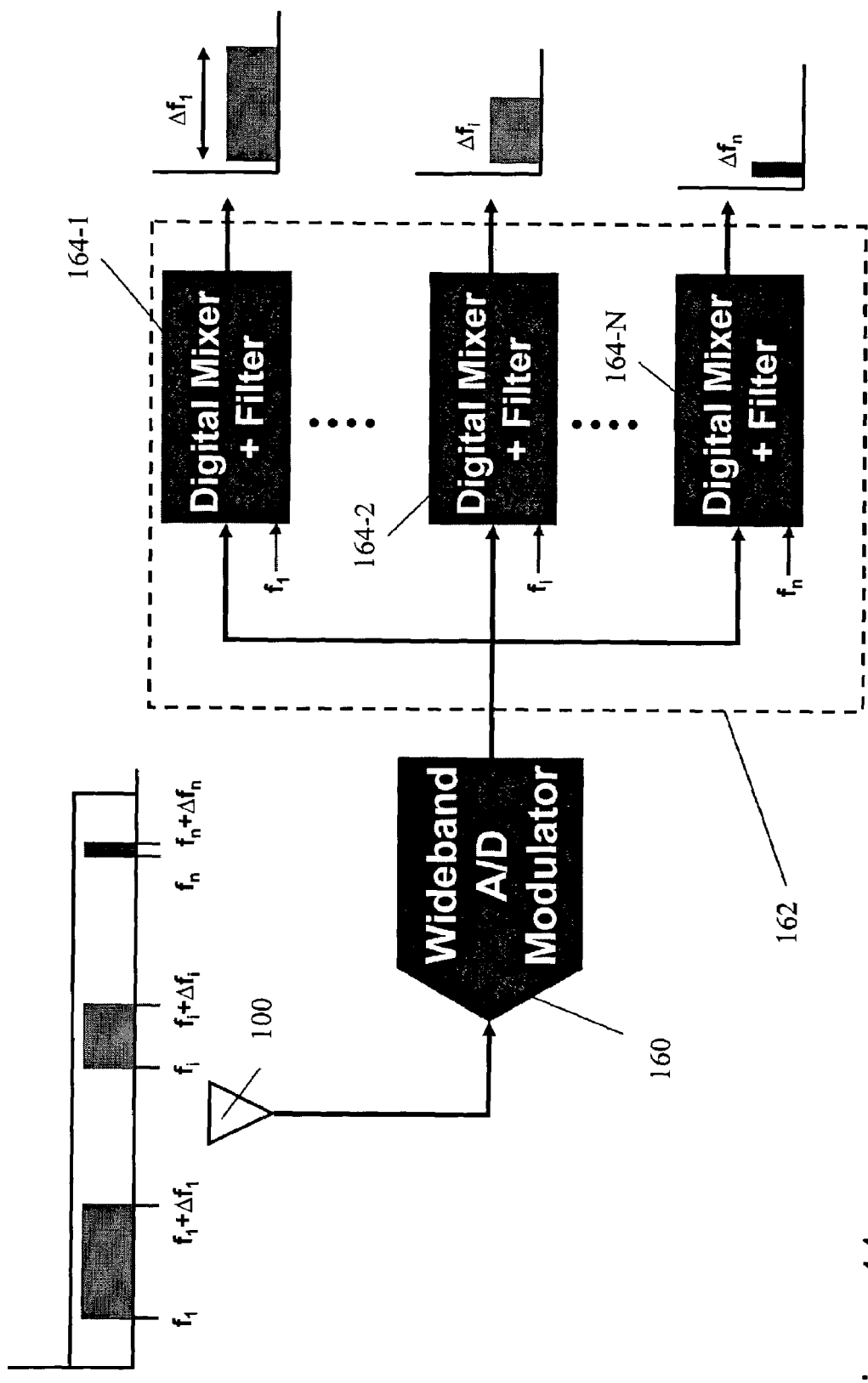
FIG. 11 is a block diagram of a receiver arrangement further detailing the channelizing concept shown generally in FIGS. 9 and 10.

FIG. 11 is a block diagram further detailing the channelizing concept shown generally in FIG. 9. An RF signal from antenna 100 is coupled to a wideband A/D Modulator. Output from wideband A/D modulator 160 is applied to a digital channelizer 162 using cross-correlator. Actually, the signal from wideband A/D modulator is replicated and applied to multiple digital mixer and filters 164-1, 164-2 . . . 164-N. The graphs at the right side of the figure illustrate that each digital mixer and filter provide a different band of frequencies out. Only the down-conversion and band selection functions are shown. The digital mixing or multiplication step can be done by using a periodic (e.g. sinewave, squarewave) reference waveform, referred to as a digital local oscillator (LO) as shown in FIG. 12.

Figure 12:
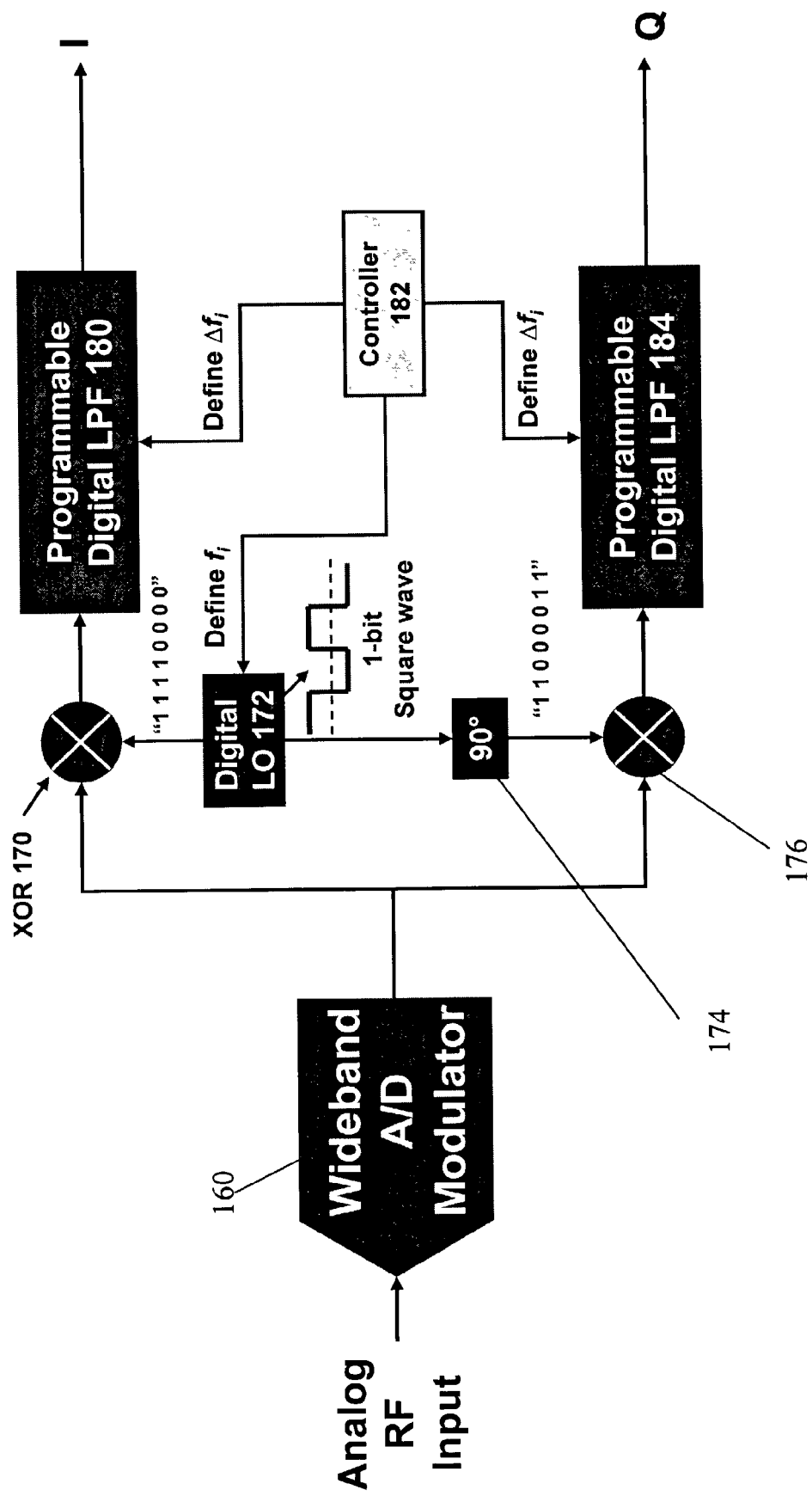
FIG. 12 is a receiver arrangement showing details of the digital mixer and filter 164-N shown in FIG. 11.

FIG. 12 is a block diagram showing greater detail of digital mixer and filter such as 164-N. As shown in the upper left portion of the drawing, it is desired to receive three bands of frequencies. An analog RF input (from antenna 100—see FIG. 11, for example) is coupled to the input of wideband A/D Modulator 160. The output of wideband A/D Modulator 160 is 1-bit oversampled digital code and is applied to a digital mixer and filter 164-N (FIG. 11) which is now shown in detail. The digital mixer portion of digital mixer and filter 164-N is represented by XOR gate 170, Digital Local Oscillator (LO) 172, phase shifter (90°) 174 and XOR gate 176. The filter portion of Digital Mixer and Filter 164-N (FIG. 11) is represented by Programmable Digital LPF 180 and programmable digital LPF 184 in FIG. 12. A controller 182 controls Digital LO 172, programmable digital LPF 180 and programmable digital LPF 184. Programmable digital LPF 180 provides an "I" output and programmable digital LPF 184 provides a "Q" output. The "I" and "Q" outputs together constitute digital baseband output. Digital LO 172 provides a 1-bit square wave in this particular embodiment. Other waveforms can be used, such as a triangular wave, sine wave, etc.

An advantage of using a square wave is that it does not have any quantization error when expressed as 1-bit code. However, it has higher harmonics. In cases, were the bandwidth is small and center frequency is high, the use of a square wave reference is preferred.

Figure 13:
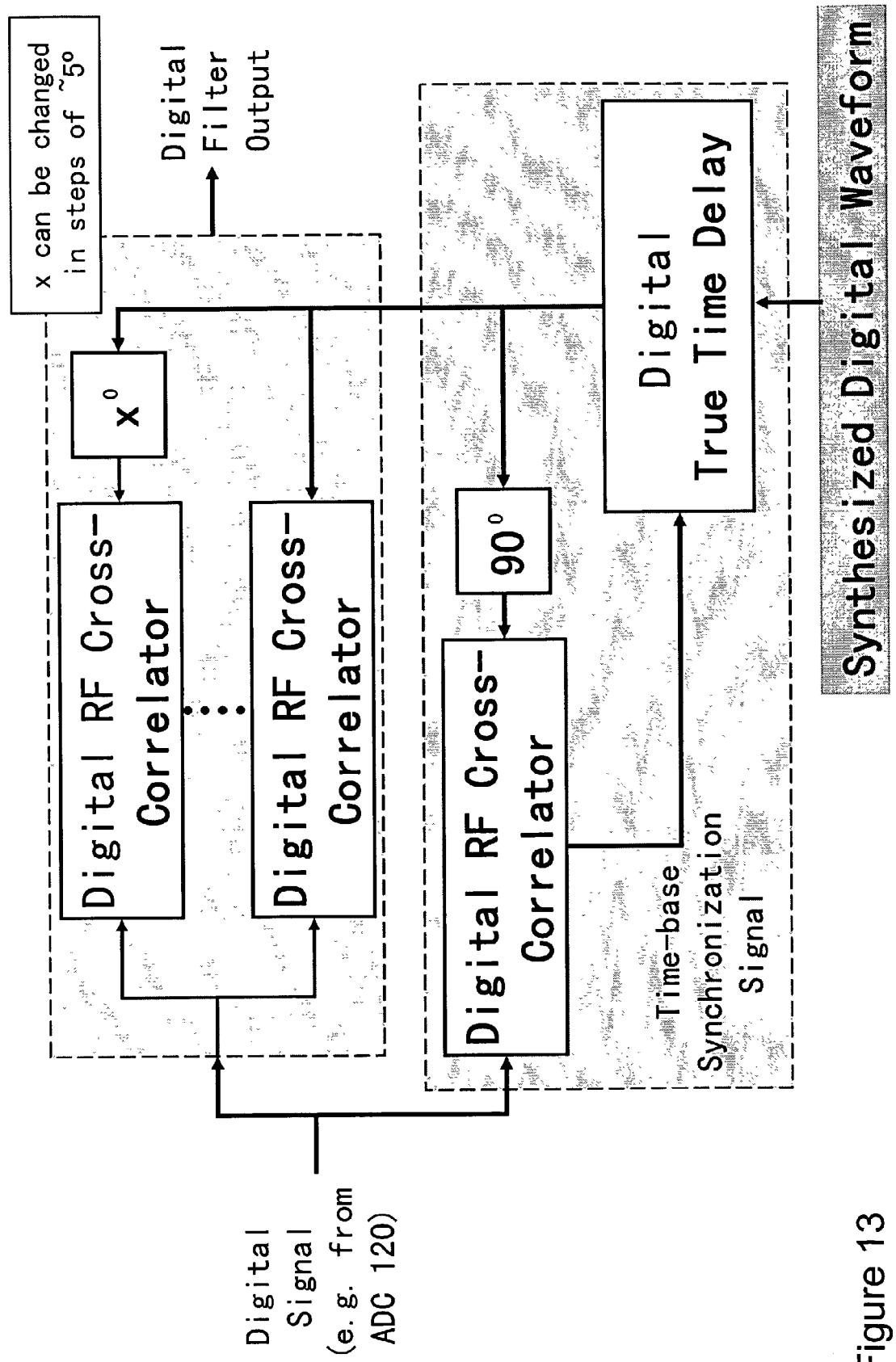
FIG. 13 is a receiver arrangement showing how synchronization is accomplished.

FIG. 13 is a block diagram of a receiver arrangement showing how synchronization can be accomplished. A digital signal (such as from ADC 120) is replicated and applied to two CBDSPs 200, 240. CBDSP 200 includes a plurality of digital RF cross correlators 222-1 . . . 222-N, to which replicated signals are applied and a variable phase delay element 224, labeled as xo. CBDSP 240 includes a digital RF cross-correlator 226, a 90° phase shifter 228 and a digital true time delay 230. A synthesized reference digital waveform is applied via digital true time delay 230 and phase shifter 228 to digital RF cross-correlator 226. The synthesized reference digital waveform is also applied via digital true time delay 230 and phase shifter 224 to digital RF cross-correlator 222-1. Phase shifter 224 can be controlled to change is phase delay is small steps, such as for example 5°. The output of CBDSP 200 provides the signal of interest. Using a phase synchronization algorithm, the phase delay of phase shifter 224 can be incrementally adjusted while 'watching' the output for correlation and adjusting phase delay until phase synchronization is achieved.

Exemplary Receiver Architecture

Figure 14:
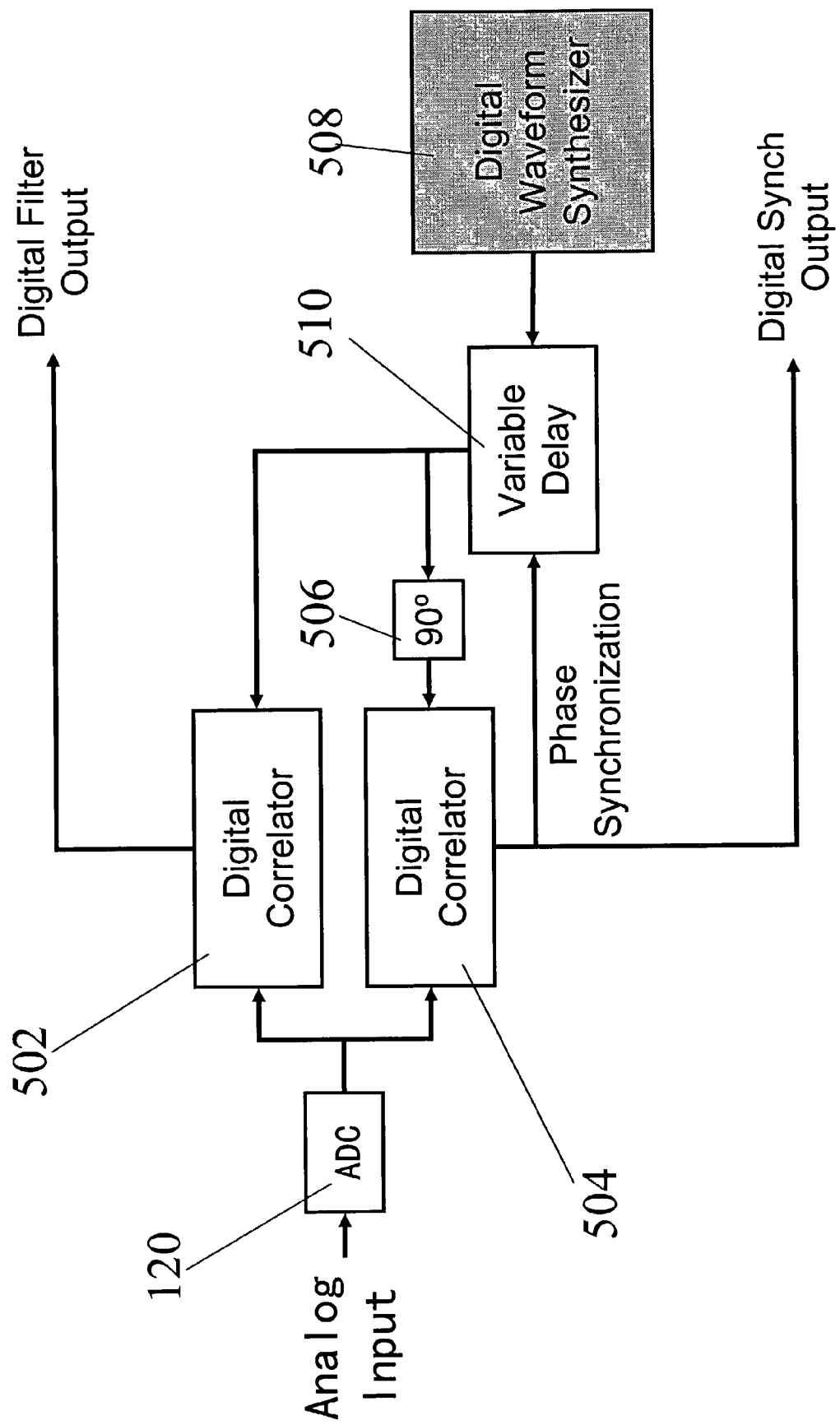
FIG. 14 is an embodiment of a quadrature correlation receiver arrangement wherein phase synchronization, between the received signal and the reference waveform, is performed by two identical correlators in phase quadrature with respect to each other.

The principles of the claimed inventions are now explained further by describing exemplary receiver architectures beginning with FIG. 14.

In this example we assume that a small signal of interest coded with BPSK waveform is added to a large interferer. It is desired to pick out small signals in the presence of large interferer which can be from the same platform, often called co-site interference.

The receiver has two frequency bands. The first band demonstrates wideband reception capability by processing the entire UHF band (175 MHz). A second narrower (10 MHz) band is chosen to maximize signal-to noise ratio.

Analog HTS Bandpass filters define these two bands. Each bandpass filter is followed by a single narrowband notch to facilitate testing with large interferers. These notch filters have a 3 dB bandwidth of 75 kHz and 25 kHz for the wider and the narrower bands respectively.

Each digital receiver comprises a 1-bit oversampled (20 GHz) Delta-ADC modulator and a 1-bit digital cross-correlator (matched filter). The basic configuration will be to demodulate a BPSK-modulated signal. A correlator such as digital correlator 130 (FIG. 3) multiplies a 1-bit ADC output by a 1-bit 20 Gsample/s digital reference waveform template (a sinewave or a square-wave). The multiplication result is digitally integrated to produce a correlation sum in each correlation frame. A decision circuit, such as decision stage 136 (FIG. 3) makes a three-level (correlated, uncorrelated, anti-correlated) decision on the value of this correlation sum.

FIG. 14 is a block diagram of a receiver arrangement. An analog RF signal is input to ADC 120. Digital samples from ADC 120 are coupled to an in-phase (0°) correlator 502 and Quadrature (90°) correlator 504. Reference input to correlator 504 is phase shifted by a 90° phase shifter 506. A digital waveform synthesizer 508 generates a reference digital waveform template, which is coupled through a variable delay 510 to correlators 502 and 504. Variable Delay 510 delays in discrete steps $t_{clk}$.

This arrangement utilizes a synchronization algorithm for BPSK. Alternative receiver arrangements using other types of modulation would use a different synchronization algorithm. As an alternative, the circuit arrangement of FIG. 14 can be extended to four correlators for demodulation of QPSK waveforms, etc. (not shown).

Figure 19:
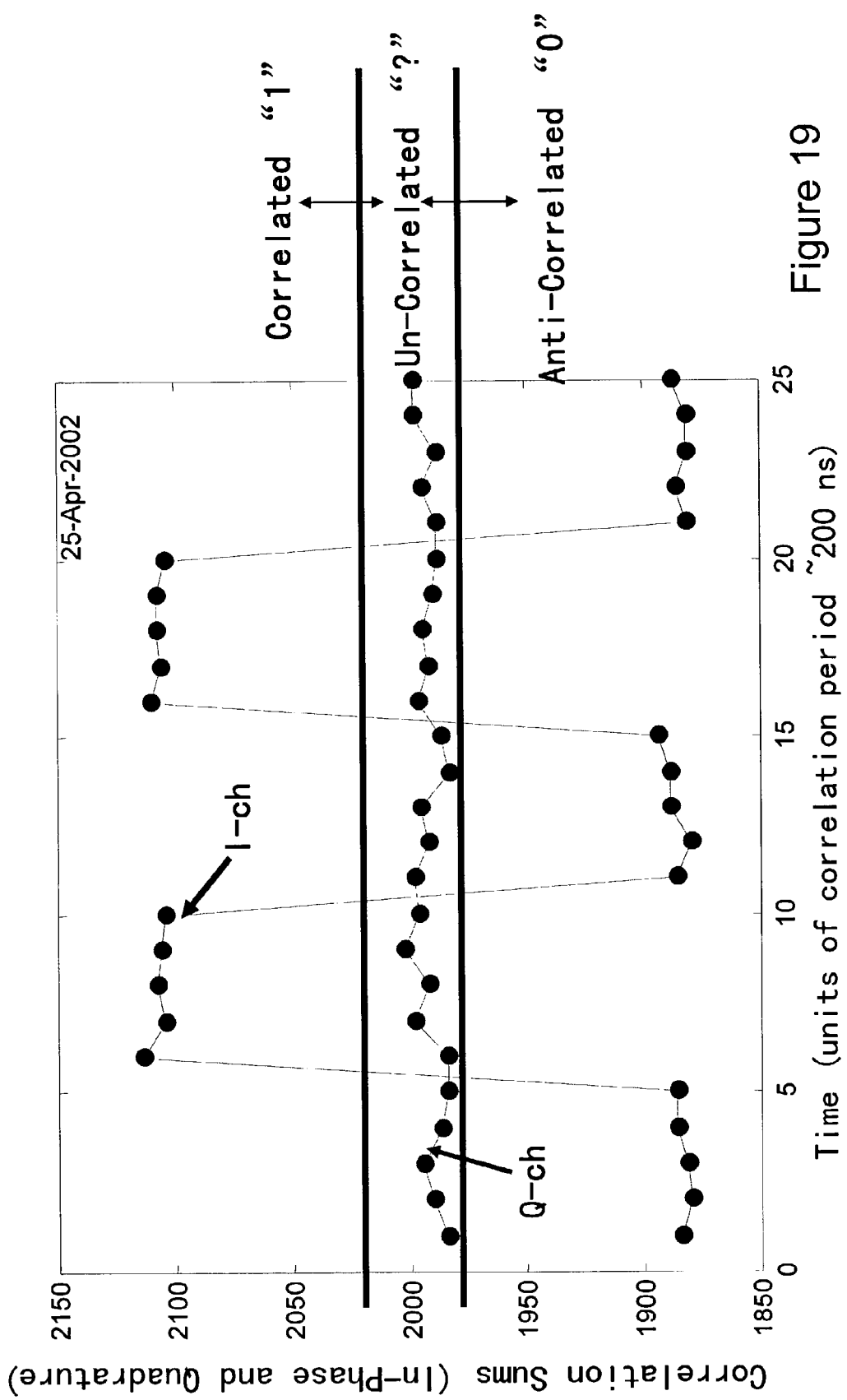
FIG. 19 illustrates operation of an RF correlation receiver.
Figure 20:
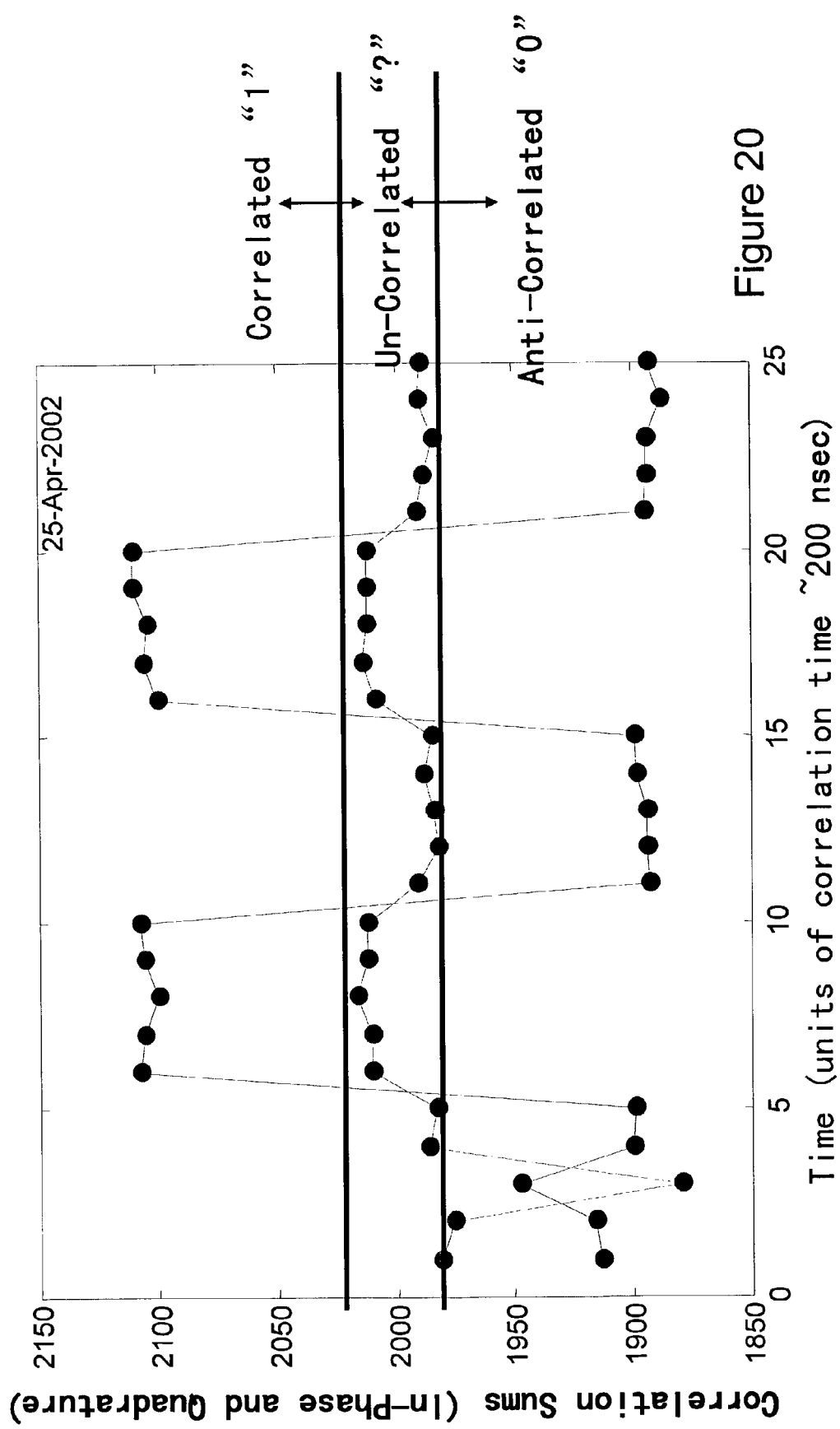
FIG. 20 shows, for a specific receiver architecture, correlation sums of the in-phase and quadrature correlators as a function of time. Initially the reference waveform is phase-shifted by 60°.

Time synchronization is based on in phase and quadrature correlations. The same reference template is applied to both correlators with 0° and 90° phase shift respectively. If the time bases are synchronized, the correlator sum from the quadrature channel is near zero (uncorrelated) while the sum from the in phase correlator is either "high", "1 (correlated) or "low", "−1" (anti-correlated). Any lack of synchronization will show up as a high or a low output from the quadrature channel. Therefore our time synchronization scheme is based on maintaining the outputs of the quadrature correlator within uncorrelated bounds as shown in FIGS. 19 and 20.

Figure 15:
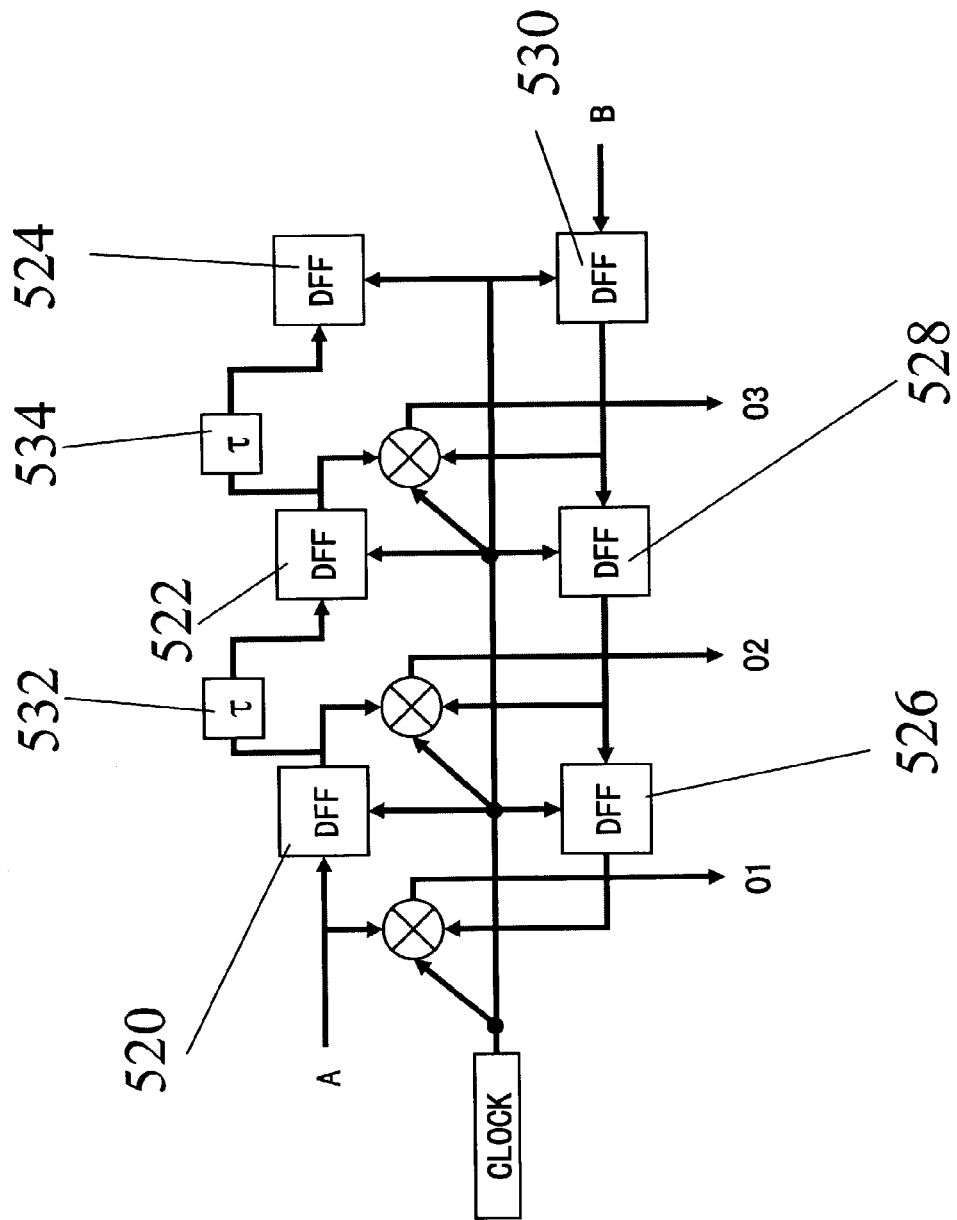
FIG. 15 is a block diagram of a receiver arrangement utilizing three correlators.

FIG. 15 is a block diagram of a receiver arrangement utilizing three correlators. The circuit arrangement includes DFFs 520, 522, 524, 526, 528 and 30. A time delay 532 is in circuit between DFF 520 and DFF522. A time delay 534 is in circuit between DFF 522 and DFF 524. A 1-bit multiplier is implemented with a clocked XOR gate. Two data streams, A and B flow in opposite directions relative to the clock. To ensure that the clock pulses arrive first at the D-flip-flop (DFF) and DFF doesn't latch before the data arrives, additional delay elements need to be inserted in the data path A.

For purposes of this example, the signal of interest is a BPSK signal assumed to be in the presence of a large interferor.

The decision circuit has two predetermined thresholds on which to judge the correlation sum. When the sum falls between these two threshold, the outcome is considered to be 'uncorrelated' or '0'. When the sum is above the higher threshold and below the lower threshold, the outcome is considered to be 'correlated' ('1') and 'anti-correlated' ('−1') respectively. The synchronizer maintains one of the outputs in the 'uncorrelated' state, thereby ensuring that the received waveform and the reference waveform are in phase synchrony.

Figure 16:
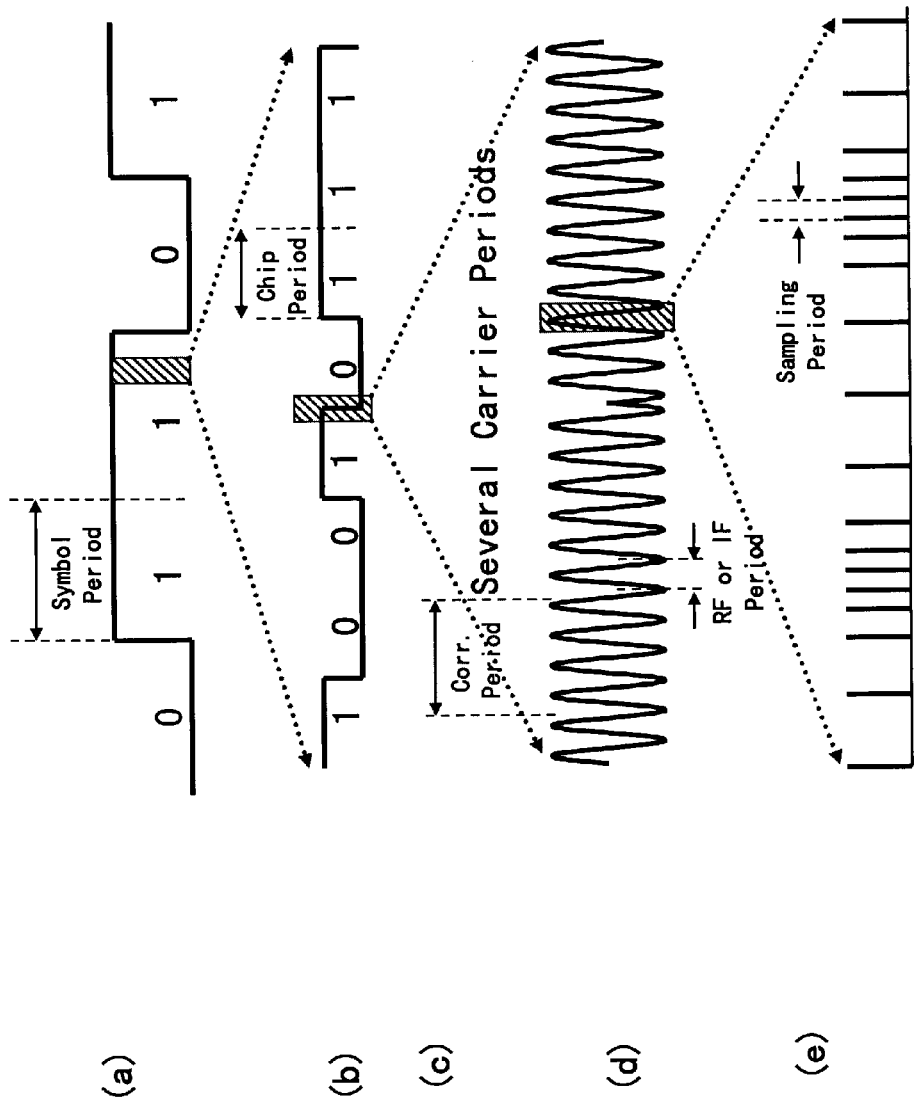
FIG. 16 illustrates various time frames associated with digital signal processing carried out by the receiver arrangements presented herein.

FIG. 16 helps to explain the various time frames related to signal processing. In this example a spread spectrum signal having symbols A basic symbol period is shown in portion (a) of the figure. The symbols have a bit rate of 5 ksps and a period of 200 microseconds. Portion (b) of the figure shows the chips having a data rate of 1 Mcps and a period of 1 microsecond. Portion (c) of the figure shows the correlation and demodulation and synchronization having a period of 200 ns. Portion (d) represents the carrier having a frequency of 100 MHz. and a period of 10 ns. Portion (e) of the figure represents a delta ADC sampled waveform at 20 GHz and a period of 50 ps.

Figure 17:
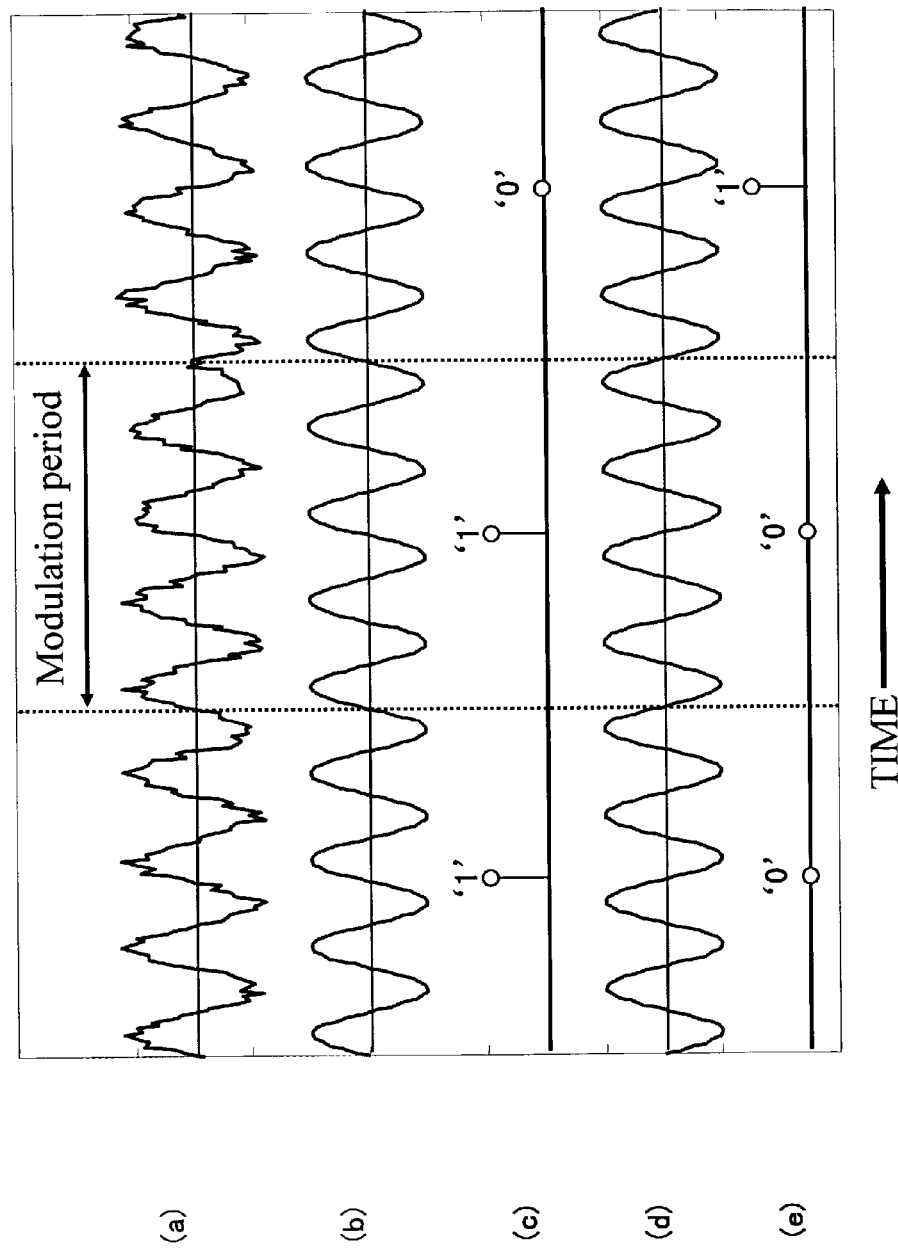
FIG. 17 is a diagram explaining how RF correlation recovers a signal of interest.

FIG. 17 helps to explain the process further by showing various waveforms during digital signal processing. Three modulation periods (along the time scale) are shown in the figure. Portion (a) represents a BPSK-modulated received signal. Portion (b) represents an in-phase reference signal used for correlating. Portion (c) represents the output "decision" of an in-phase correlator. Portion (d) represents an anti-phase reference. Portion (e) represents the decisions of an anti-phase correlator. Note that the decisions of the in-phase and anti-phase correlators are opposite. A "1" output from the in-phase correlator corresponds to a "0" output from the anti-phase correlator.

Figure 18:
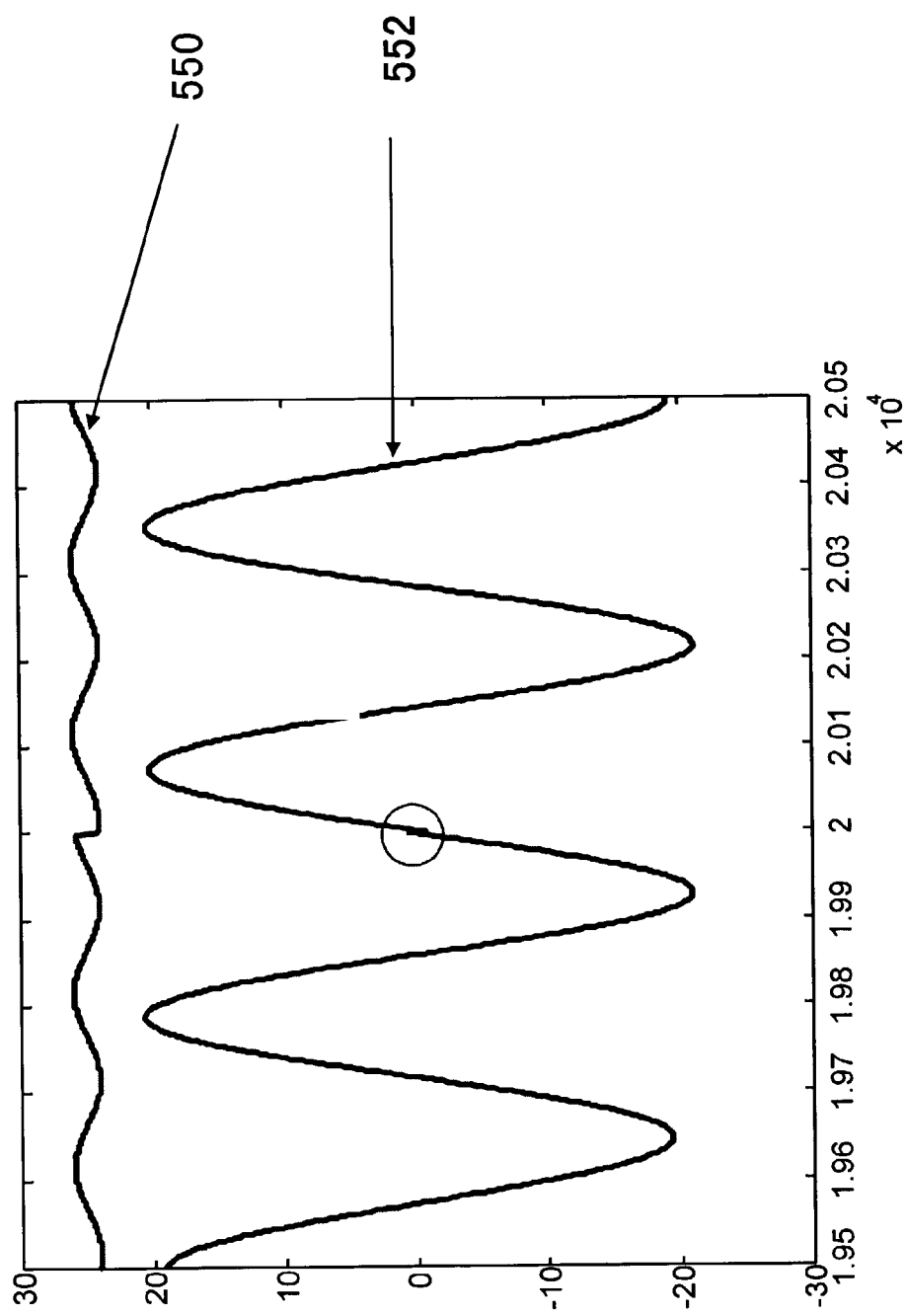
FIG. 18 illustrates the operation of an exemplary receiver architecture for receiving a BPSK signal wherein a small signal-of-interest, a BPSK modulated sinewave, is in the presence of a large interferer.

FIG. 18 shows an input signal that includes a small BPSK-modulated carrier at 100 MHz and a large interferer at 70 MHz. The BPSK-modulated signal of interest (SOI) is indicated by reference numeral 550. The received signal (SOI+Interferer) is indicated by reference numeral 552. The time scale of the horizontal axis is in units of sampling time about 50 ps.

This signal is first digitized by a phase modulation-demodulation delta-ADC1, and then correlated with a 100 MHz sinewave that is also digitized with the same delta-ADC algorithm. These two signals are XOR-ed and counted in a digital accumulator over a correlation frame period of 200 ns. Thresholding of the correlation sums yield the correct digital output. Even if the initial phase is not aligned to either channel, a coarse synchronization algorithm rotates the reference phasor, using time delays, to achieve sufficiently good phase alignment with the in-phase correlator. A fine synchronization algorithm cam be utilized to refine the phase alignment. The effect of phase alignment to the quality of detection needs further study. The decision stage and the phase synchronization algorithm can be implemented in software.

FIGS. 19 and 20 help to explain how correlation is used to identify the signal of interest. FIG. 19 shows correlation sums of the in-phase and quadrature correlators as a function of time. The correct digital output can be obtained from the I-channel output in spite of the large interferor. The signal of interest is 1 MHz BPSK, 100 MHz. carrier, −23 dBFS, Phase shift 0 degrees. The Interferer is 70 MHz. FS; Ref: 100 MHz FS; Oversampling is at 20 GHz. The correct digital output can be obtained from the I-channel output in spite of the large interferer.

An input signal is constituted by alternating 0s and 1s chosen for simplicity. The dark line is the correlator output. The other one—gray circles represents quadrature channel synchronization. Correlation requires you to have synchronicity between ADC output and the digital template. There are means to do that. Suppose everything is synchronized. Correlation output which is represented by the circles in FIGS. 19 and 20. For each data point you can make a decision as to whether the data point represents a "1" or a "0". If anti-correlated, it is a 0 if correlated, it is a 1. This is the manner in which demodulation is accomplished.

FIG. 20 shows correlation sums of the in-phase and quadrature correlators as a function of time. The Signal of Interest is 1 MHz. BPSK, 100 MHz. carrier, −23 dBFS, Phase shift 60 degrees. The interferer is 70 MHz. FS; Reference 100 MHz. FS; Oversampling at 20 GHz. Initially the reference waveform is phase-shifted by 60°. After a few correlation frames, the coarse synchronization algorithm is able to track the phase-lock, producing the correct demodulated digital output.

A 1-bit data stream is produced by the ADC and is input to the multiplier, constituted by an XOR gate. A low level signal of interest coded with a binary phase shift keying (BPSK) waveform is present along with a large interferer. The objective is to pick out the lower level signal of interest in the presence of larger interferer signal which could be, for example, from the same platform, often called co-site interference.

The input signal, for simplicity, is shown as alternating 0s and 1s. The dark line is the correlator output. The other one—gray circles represents quadrature channel synchronization. Correlation requires you to have synchronicity between ADC output and the digital template. There are means to do that. Assuming synchronization, the correlation sums (represented as circles) correspond to counts on the left axis. You can make decisions based on bands of counts to determine if each circle represents a "0" or a "1". If the incoming signal is anti-correlated with the template the "0" decision is made. If the signals are correlated, a "1" decision is made. This process results in a demodulated signal of interest.

Figure 21:
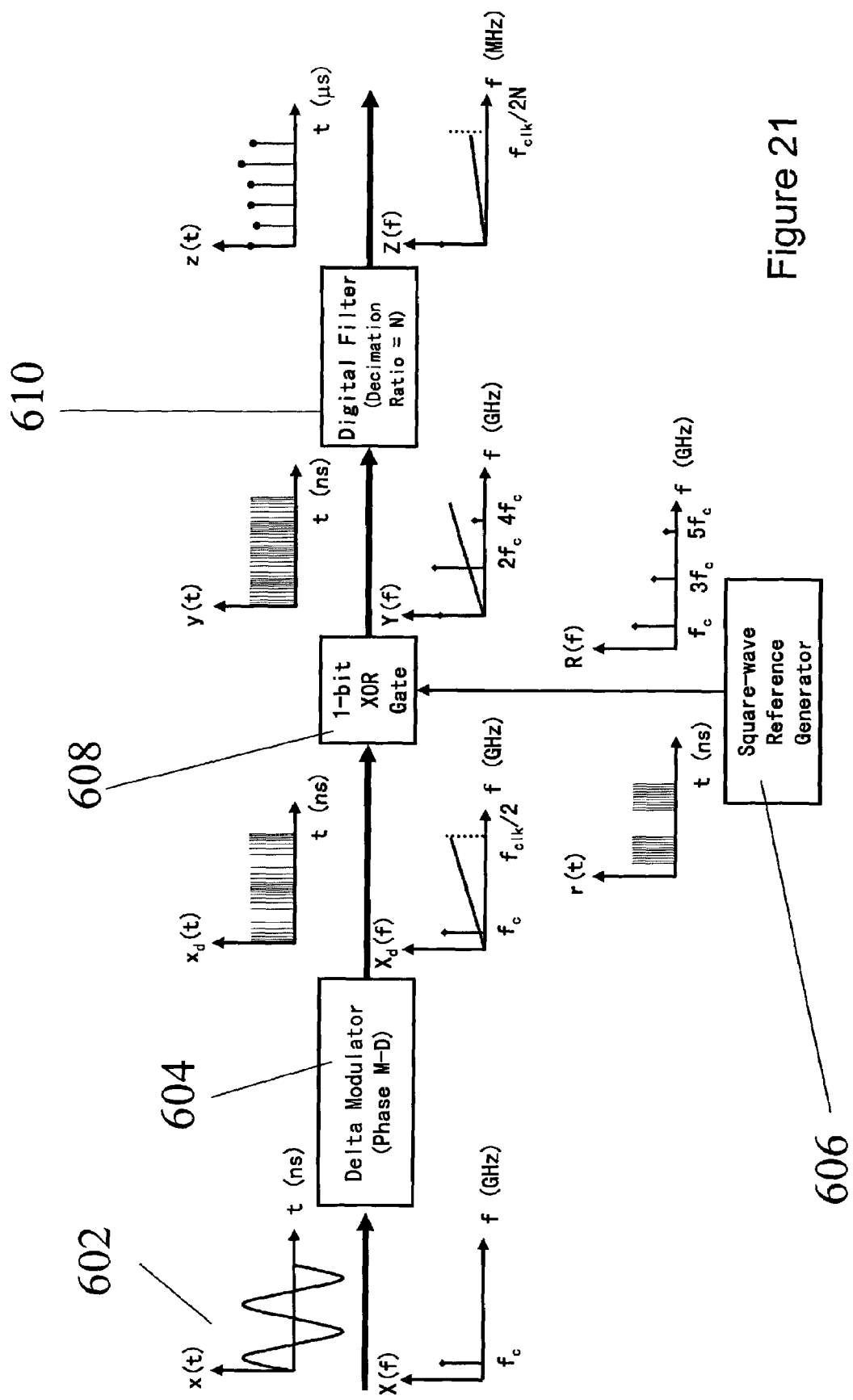
FIG. 21 is a schematic diagram of the correlation receiver, with small plots showing the signal at various stages in the signal processing, in both time- and frequency-domains.

FIG. 21 is a schematic diagram of another superconducting correlation receiver, with small plots showing the signal at various stages in the signal processing, in both time- and frequency-domains. In general this arrangement is a down-conversion with single bit cross-correlation.

The analog input signal (indicated by sine wave 602 is at a carrier frequency fc~100 MHz) as it enters a digitizer, our Phase Modulation ADC, which is functionally a delta modulator 604. This generates a 1-bit oversampled delta code xd(t) for the time-derivative of the input signal; the density of unit pulses (up to the clock frequency fclk~20 GHz) is proportional to the derivative of the signal (with a positive offset). The spectrum of quantization noise rises linearly as the frequency increases (similar to the well-known distribution in a sigma-delta ADC), and is a maximum at the Nyquist frequency fclk/2~10 GHz. (The oversampling ratio is reduced in the plots for clarity.)

The reference signal, from a square-wave reference generator 606 is a 1-bit oversampled square wave, generated from the clock by a simple gate circuit (such as that triggered by a standard dc/SFQ gate). There is very little noise on this reference, and even the odd harmonics are not a problem. This square wave performs much better than a digitized 1-bit sine wave as the reference, due to better noise properties. While a 1-bit digital representation of a sinewave contains quantization noise that of the square-wave does not. The quantization noise on a sinewave reference show a high degree of unwanted correlation (or anti-correlation) with the quantization noise on the input spectrum.

An XOR gate 608 multiplies the signal and reference pulse trains. The XOR with a [0,1] square wave is mathematically equivalent to true binary multiplication with a [−1,1] square wave. This serves to down-convert the input at the carrier frequency fc down to dc, as well as mixing up to 2 fc. Output of XOR gate 608 is passed through a digital decimation filter 610 which filters out the component at 2 fc, as well as narrowing the bandwidth to remove broadband quantization noise.

As an alternative, there can be included a second correlation channel in quadrature to the first, using a phase-shifted reference generator, together with another XOR gate and digital filter. Both of these channels should be able to fit on a single superconducting chip.

In another arrangement, we have generated a 1-MHz BPSK signal based on a 100 MHz carrier, with alternating '1' and '0'. Using the square wave reference. The correlation sum alternates between the '1' and '0' for the "in-phase" reference, while the quadrature reference yields shows no correlation in either case. This is illustrated in FIG. RA8.

Figure 22:
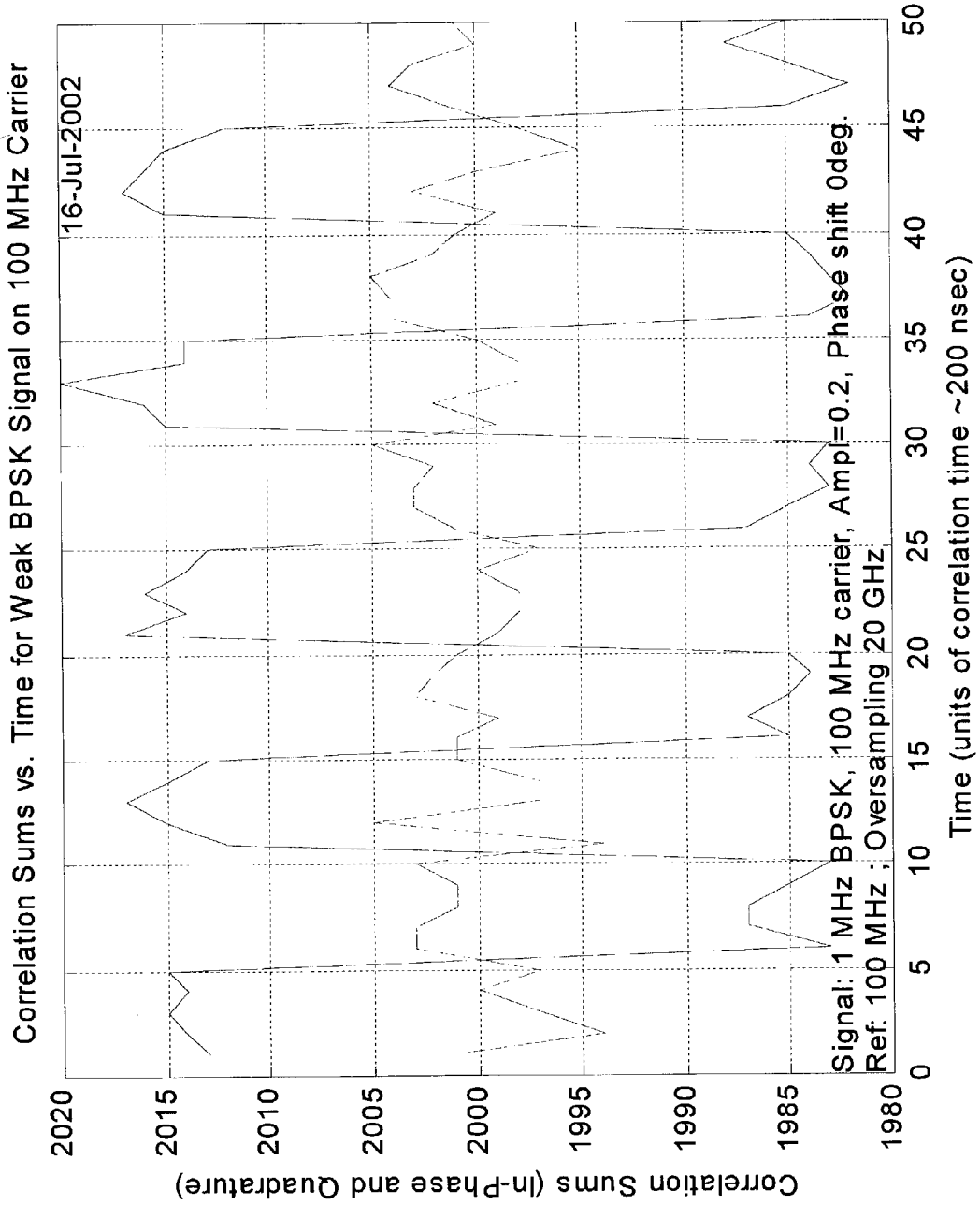
FIG. 22 shows an example of the correlation sums of the in-phase and quadrature channels using square-wave reference.

FIG. 22 shows correlation sums of the in-phase and quadrature channels using a square-wave reference. The noise is significant, but can be further reduced by increased filtering.

Figure 23:
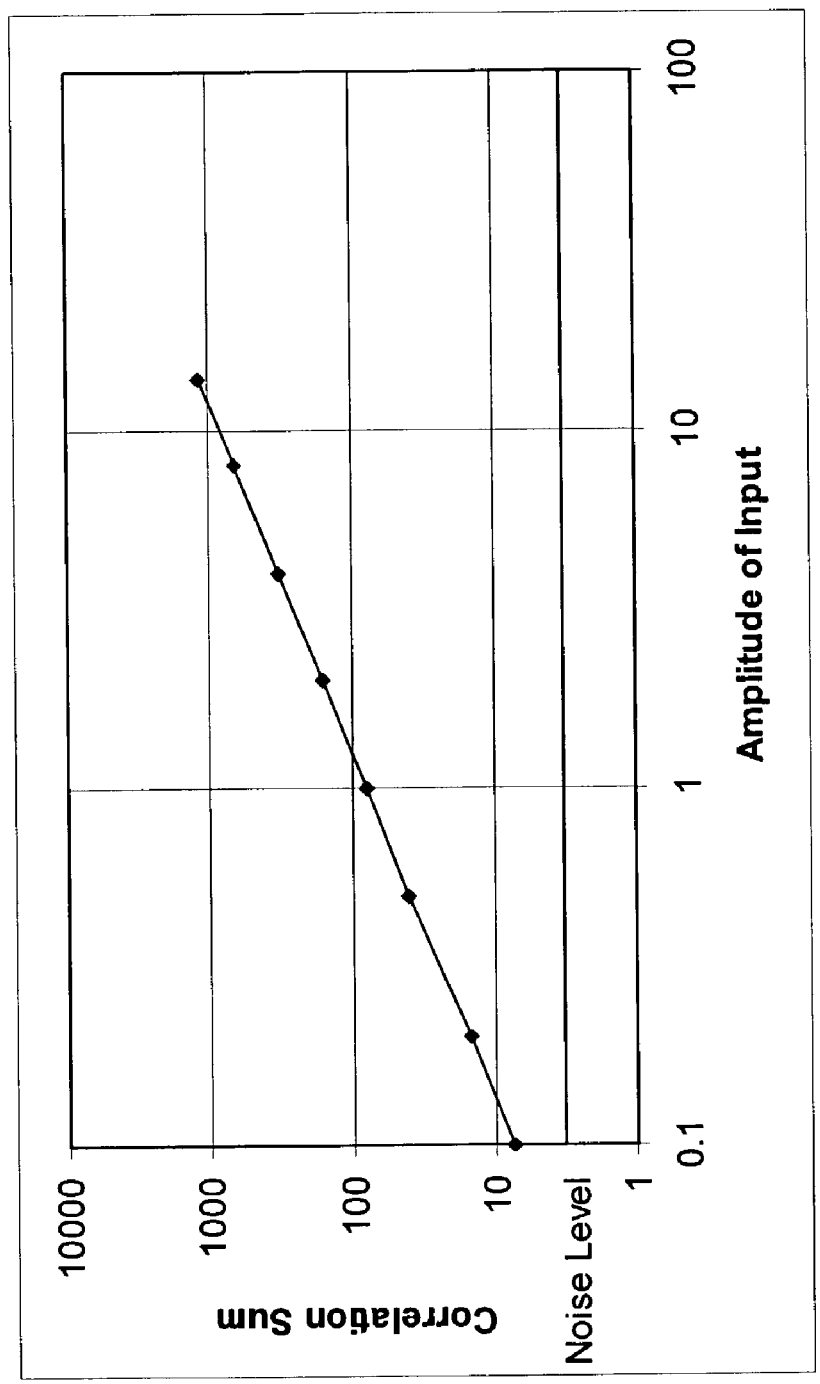
FIG. 23 is a graphical representation showing that the correlation sum is proportional to the amplitude of the input signal, confirming the validity of our square-wave mixing scheme.

FIG. 23 shows the net correlation sum (which is +/−15 in the example in FIG. 22 vs. amplitude of the signal. This correlation sum is proportional to the signal amplitude, and is limited at the lower end by the noise level (+/−3). This confirms the validity of using a square-wave mixing scheme.

Figure 34:
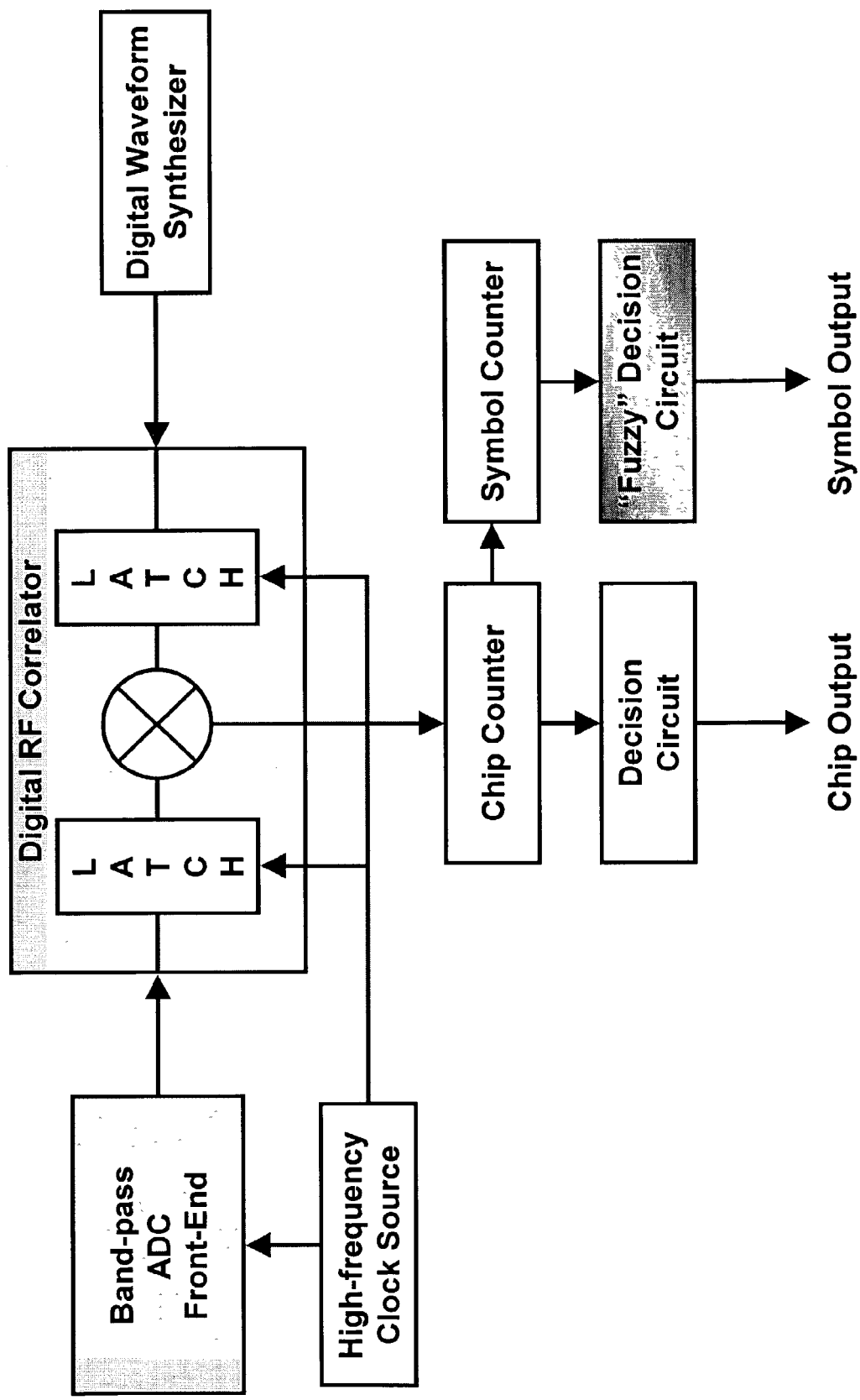
FIG. 34 shows a receiver arrangement having a correlator comprising a multiplier coupled between two latches.

FIG. 34 shows a receiver arrangement having a correlator comprising a multiplier coupled between two latches. The counter can be split into two parts, corresponding to chip interval and symbol interval respectively, producing both chip and symbol outputs, corresponding to demodulation and de-spreading. The binary decision circuit may include the probability associated with each decision.

A 1-bit cross-correlator correlates the digitized data stream to the waveform template. Only one correlation stage is required if the two digital waveforms are perfectly synchronized. Multiple (3 to 5) correlation stages, each delayed by a single clock period, improves tolerance to imperfect phase (time-base) synchronization. The correlator output, integrated over the chip duration yields a correlation sum corresponding to the chip value, determined by a binary decision circuit. The chip counter output can be further integrated over the duration of a symbol to yield the symbol value through a similar decision circuit.

The "fuzzy" decision circuit, produces outputs "0" and "1" with associated probabilities. The counter output will be a number between "0" and "N", where the count of "0" or "N" corresponds to two binary symbols. However, because of errors induced by channel noise, phase synchronization error etc., the counter output will often lie between the two extremes, requiring a decision circuit. Instead of a single bit zero-one decision, a decision with an associated probability may be needed. For example, the output could be multi-bit ("000" to "111") which can be processed as a "0" with probabilities of 0,1/8, 1/4, 3/8, . . . , 7/8, 1.

The digital integrator (counter) following the correlator can be further divided into smaller intervals to extract more information about a signal that changes frequency due to relative motion of the source and the generator.

Figure 35:
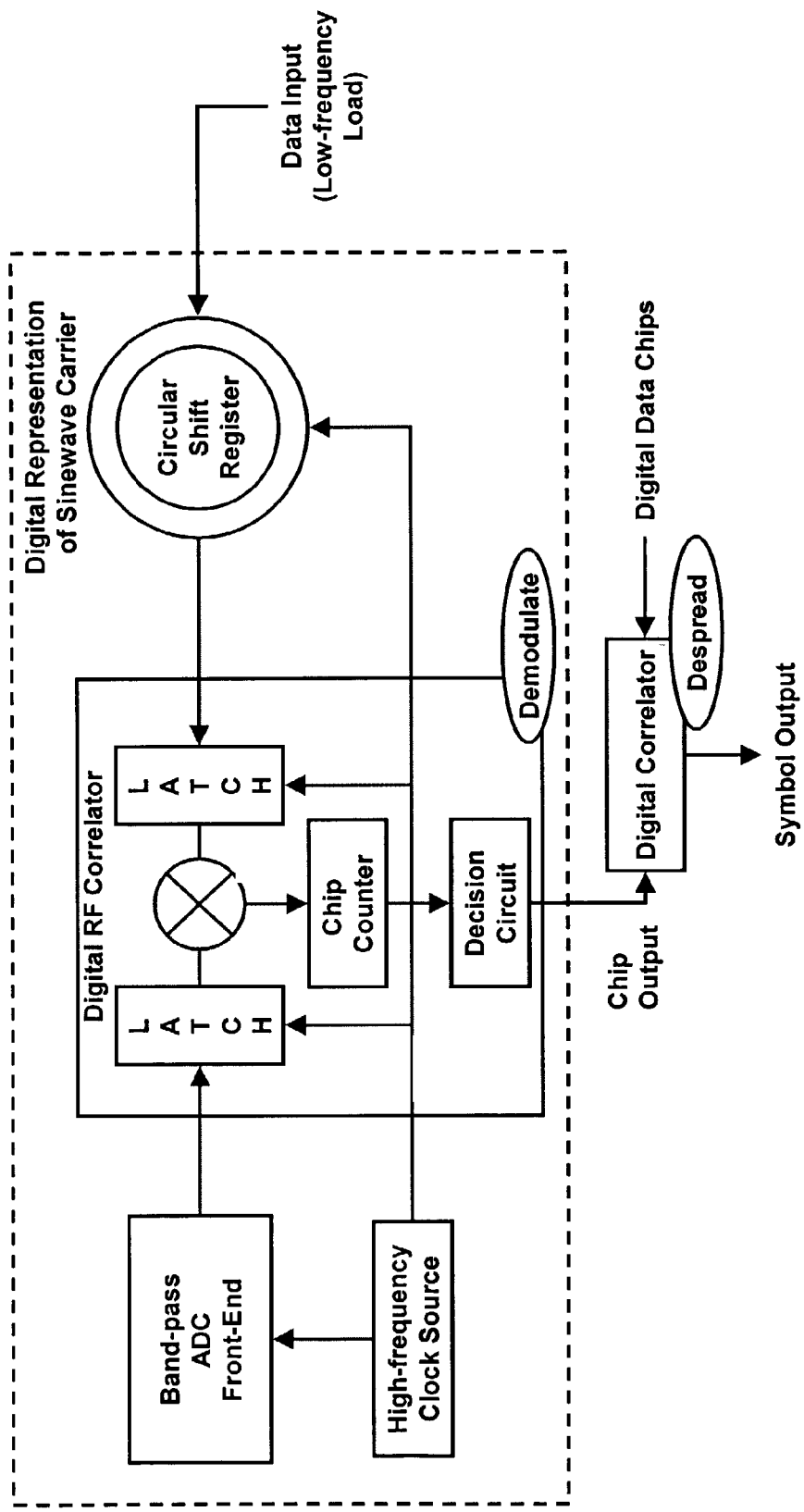
FIG. 35 shows another receiver arrangement that uses two correlators—one for demodulation and the other for despreading.

FIG. 35 shows another receiver arrangement that uses two correlators—one for demodulation and the other for de-spreading. The functions that require fast superconductor electronics are bounded by a dashed line. While only one correlator, operating on the RF waveform, can perform down-conversion and demodulation as well as de-spreading with an appropriate digital waveform template, a scheme using two correlators, decoupling the demodulation and de-spreading functions, is simpler to implement. Here the first correlator performs correlation of the ADC output against the digital representation of the sinusoidal carrier. The output of this correlator stage is the sequence of demodulated digital chips. A second correlator, which is essentially a conventional CDMA correlator, then de-spreads the chips into the symbols.

Although this two-correlator scheme uses additional circuitry, it has certain advantages over the arrangement that employs a single correlator. Firstly, the second correlator may be implemented using conventional room temperature semiconductor electronics, at least initially to simplify superconductor electronics fabrication. The digital RF correlator can be designed as a demodulator using simple sine wave waveform templates. In the most general case, the digital RF waveform template is streamed to the chip from a room temperature library. This allows variation in pattern repetition length and guarantees that no dead time is required to r load templates. As an alternative, the template can be first loaded in a circular shift register and then clocked out continuously on chip. This obviates the need for streaming high frequency (10 GHz) input to the chip. The correlation-based digital receiver is fully functional when there is provided a complete waveform library.

ADC 120

Figure 24:
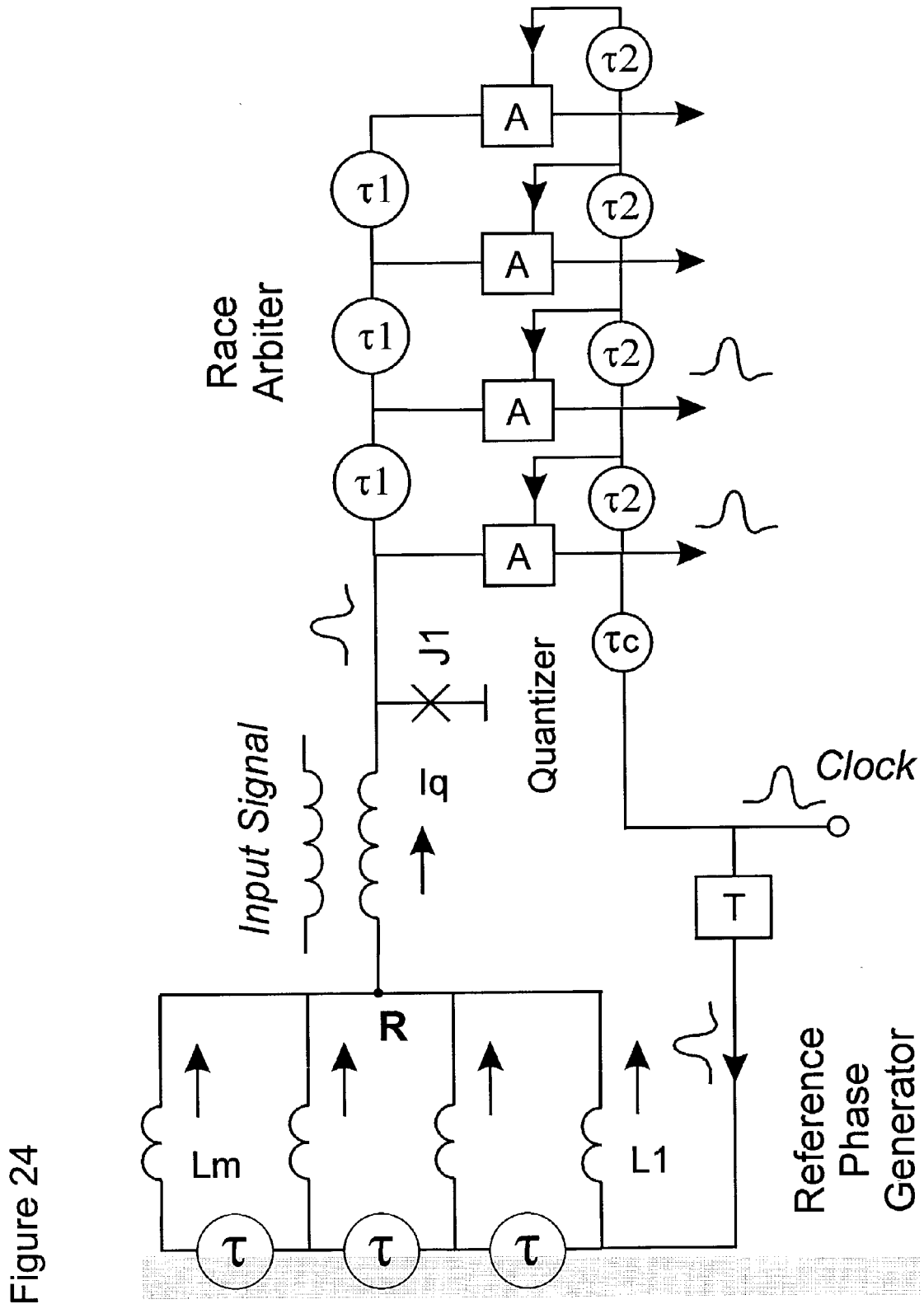
FIG. 24 is a schematic diagram of a race arbiter circuit that can be used as ADC 120.

ADC 120 can be implemented in a number of ways. One possible configuration for the ADC 120 is a so-called 'race arbiter' circuit. A basic race arbiter circuit is shown in FIG. 24. A race arbiter determines the arrival of one signal with respect to another signal in time. In rapid single flux quantum (RSFQ) circuits digital "1" ("0") is represented by the presence (or absence) of data signal with respect to clock signal, where both data and clock are in the form of single flux quantum (SFQ) pulses. Therefore, the time resolution (or speed) of an RSFQ circuit is defined by the clock frequency. However, when the switching time of circuit elements, Josephson junctions (JJs), is smaller than the clock period, the time resolution can be increased by racing the clock and the data against each other and determining their relative timing.

The racing function is accomplished by using variable active delay lines, called Josephson transmission lines (JTL). By varying the dc bias, the propagation delay of SFQ pulses on a JTL can be controlled. The arbitration function is performed by logic elements. We have three different implementations of race arbiter circuits, which are used in different circuits, such as analog-to-digital converter (ADC) and time-to-digital converter (TDC).

Static Race Arbiter Configuration

A race arbiter consists of variable delay elements (□) and clocked latches (L). The variable delay element is a JTL. A latch is a comparator with memory. There are various implementations of a latch, such as a data flip-flop (DFF), set-reset flip-flop (SRFF) and set-reset-clear flip-flop (SRC). Although the two signals that race against each other can be of any type, for simplicity we refer to them as DATA and CLOCK.

The simplest latch has two inputs (DATA and CLOCK) and one output (OUT). A DATA pulse sets the latch (stores a "1" in the latch in the form of a flux quantum). A CLOCK pulse resets the latch and reads the state of the latch. When clocked, an SFQ pulse (or a "1") is produced at the output (OUT) if the latch had a stored flux quantum. If the latch did not have a stored flux quantum, no pulse is produced at the output after the latch is clocked. In other words, if a DATA pulse arrives at a latch before the CLOCK pulse, OUT=1 and if a DATA pulse arrives at a latch after the CLOCK pulse, OUT=0.

The timing of DATA with respect to CLOCK can be determined by looking at the output of a single latch with an accuracy of a clock period (T). An n-channel race arbiter allows the determination of the timing of DATA with respect to CLOCK with an accuracy of T/n.

Figure 25:
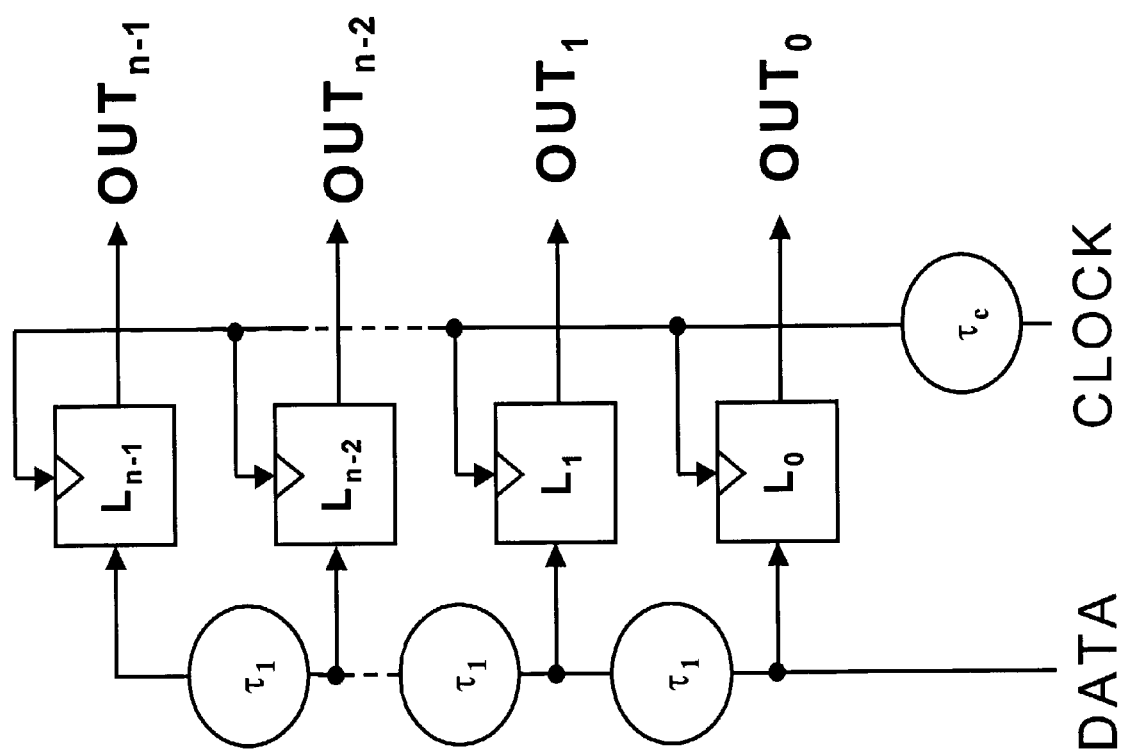
FIG. 25 is a schematic diagram of an n-channel race arbiter with variable delay elements and clocked latches.

FIG. 25 is a block diagram of an n-channel race arbiter with variable delay elements (□) and clocked latches (L).

Variable delay lines have been inserted into the DATA path, so that the DATA signal arrives at the input of different latches at different times. The latches are clocked simultaneously and outputs are produced periodically (once every clock period, T). The delay ($\Box c$) is inserted in the CLOCK path to adjust the relative timing of the CLOCK pulse train with respect to DATA. This circuit can be used to measure the timing of the DATA signal with an accuracy of $\Box 1 = T/n$. As an example, consider a 4-channel synchronizer. If the outputs after a clocking event are OUT0=1, OUT1=OUT2=OUT3=0, then the DATA pulse precedes the CLOCK pulse by T/4. In general for an n channel synchronizer, if the outputs are OUT0=OUT1 . . . = . . . OUTi−1=1, OUTi . . . = . . . OUTn−1=0, then the DATA pulse precedes the CLOCK pulse by (i/n)T.

Figure 26:
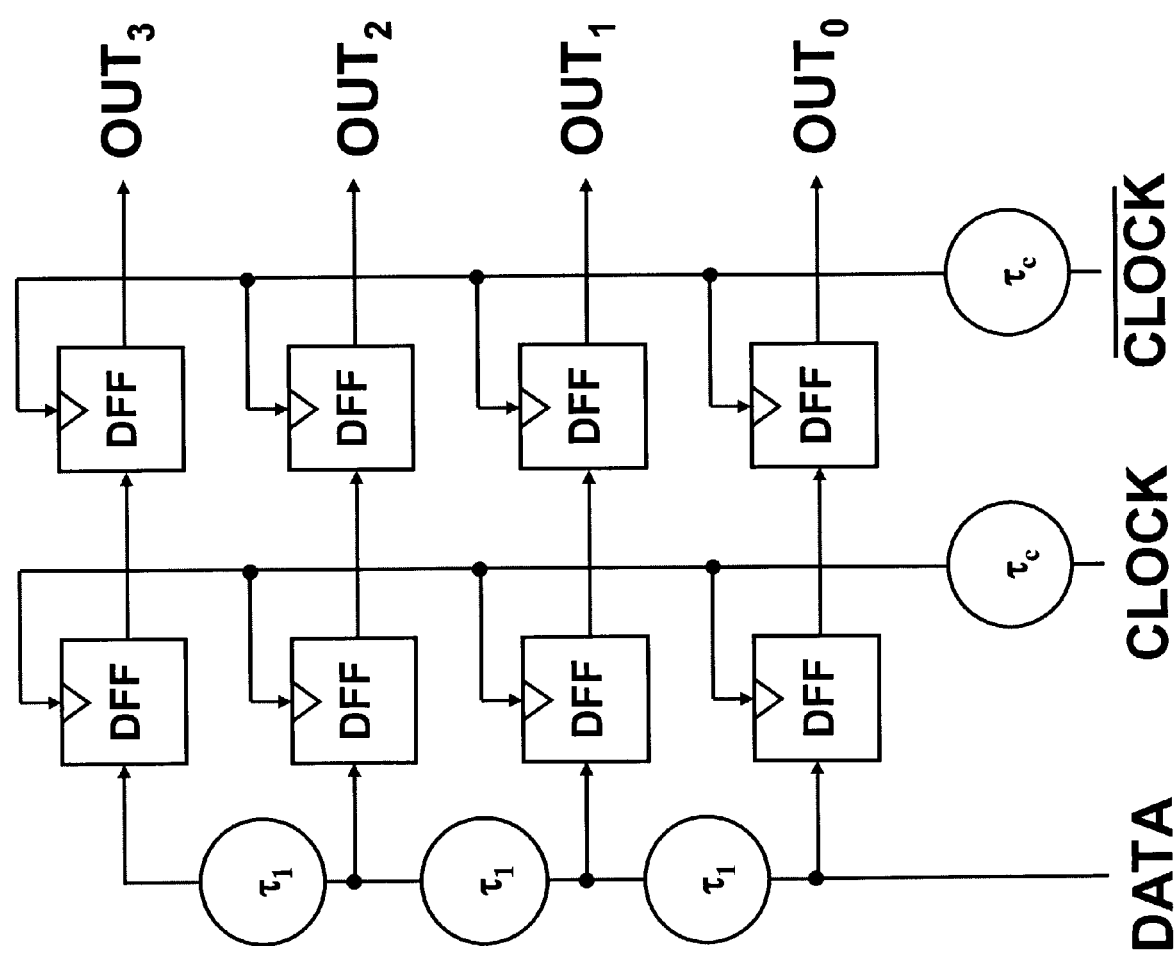
FIG. 26 is a block diagram of a 4-channel race arbiter with two sets of alternately clocked D-flip-flops.
Figure 32:
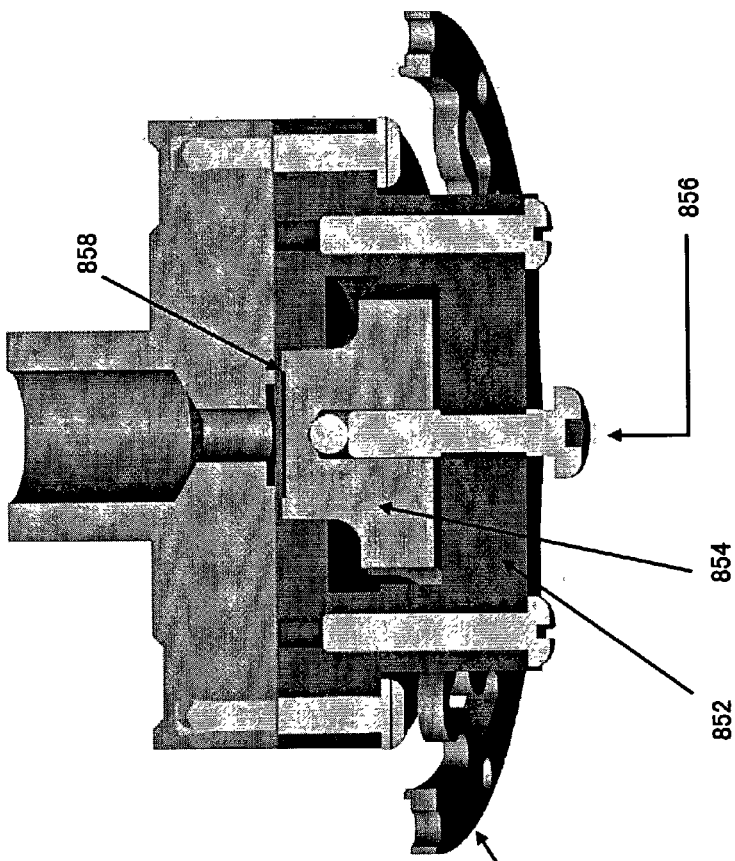
FIG. 32 shows a chip housing.

FIG. 26 is a block diagram of a 4-channel race arbiter with two sets of alternately clocked D-flip-flops. The race arbitration scheme can be made more robust by using two sets of latches as shown in FIG. 32, clocked by alternate phases of the clock (CLOCK and $\overline{\text{CLOCK}}$). If at any latch, the DATA and the CLOCK arrive simultaneously (or very close to each other in time), the timing of the latch output is no longer synchronized with the CLOCK pulse. In other words, the stored flux quantum in the latch is released at the output after a longer delay. This may cause an error in the output signal. To reduce the probability of error, two or more sets of alternately clocked latches can be used.

Figure 27:
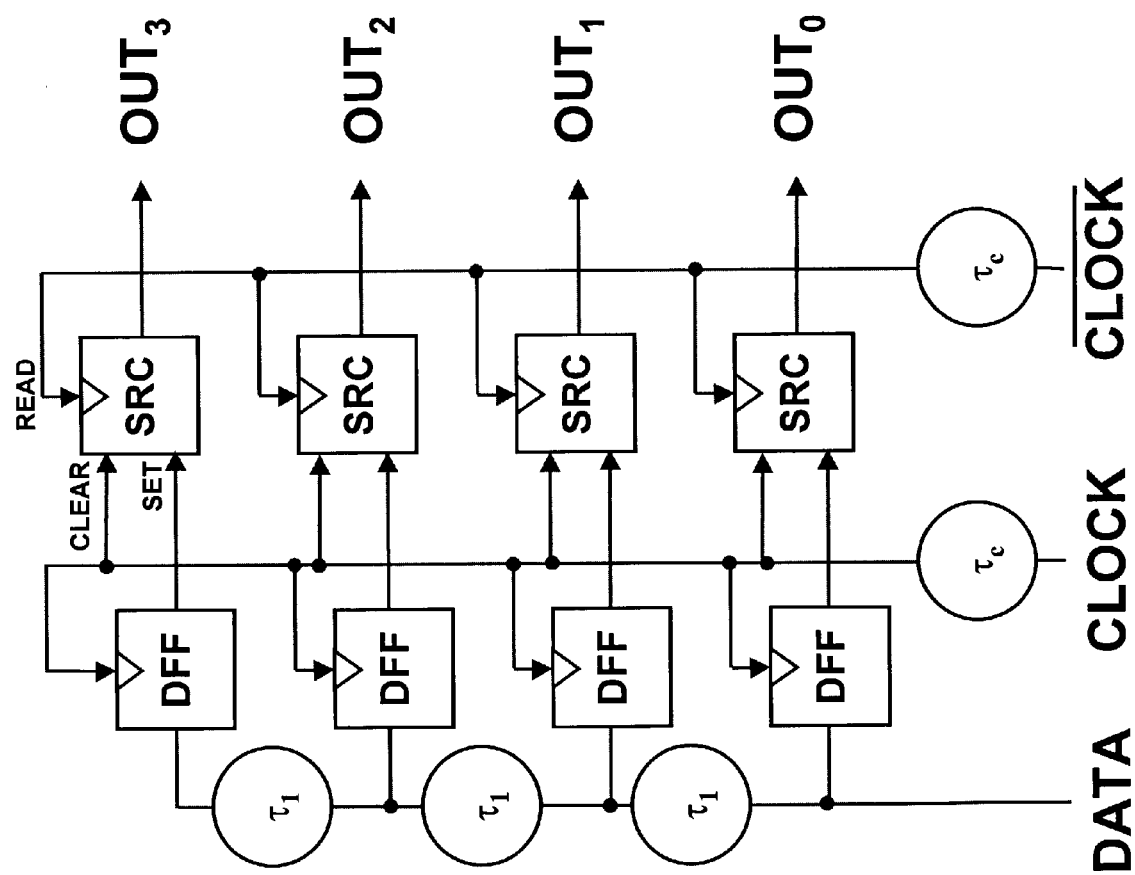
FIG. 27 shows another implementation of the race arbiter using an SRC flip-flop to alternately clear and read the memory.

Numerous variations of the static race arbiter circuit are possible by using different types of clocked memory elements (latches or flip-flops). For example, FIG. 27 shows another implementation of the race arbiter using an SRC flip-flop to alternately clear and read the memory.

Superconducting Fabrication and RSFQ Logic

Superconductor Rapid Single Flux Quantum (RSFQ) logic devices have been and continue to be developed. They are proving to be capable of ultra-fast processing at very low power consumption. These devices utilize Josephson junctions. The inventions described and/or claimed herein must be fabricated from logic that is sufficiently fast to operate at clock rates needed to quantize an incoming RF signal directly without the need for down-conversion. RSFQ circuits are custom-fabricated by fabricators such as Hypres, Inc. It is presently preferred that the RSFQ logic family be used to implement the various arrangements described in this patent document. However, the concepts and arrangements described can be implemented using any sufficiently fast logic family including those to be developed.

It is presently preferred that the various circuit arrangements described herein are built as a 'package' having a custom manufactured integrated circuit (IC) that is appropriately integrated into a cryocooler. The IC is fabricated 'made to order' based on a specific design, by a superconductor IC fabricator such as, for examples, Hypres, Inc., TRW and other custom fabricators. The package is fitted with appropriate input and output connections to provide for input signals and output signals. The circuits are integrated using RSFQ logic.

The custom IC, including, for example, ADC and CBDSP is cooled to its operating temperature by using various arrangements. The arrangement selected depend at least in part on the system platform and constraints imposed by the overall arrangement in which the ADC and correlator are used. The ADC and correlator reside in a cooling package that can be thought of as a "thermal conditioning" package, much like semiconductor devices are equipped with appropriate mini-fans and/or cooling fins and/or active closed cycle coolers to help them maintain a desirable operating temperature.

Some of the specific alternatives for cooling the superconducting ADC and correlator, i.e. cryocooling, are as follows.

One such alternative is to immerse the circuits in a liquid cryogen, typically liquid helium which has a temperature of 4.2 Kelvin. The liquid helium is maintained in an insulated Dewar (similar to a thermos bottle), and the electrical leads are designed to minimize the heat conduction from room temperature to the cryogenic temperatures. Dewars can be purchased commercially and appropriate interfaces and enclosures implemented on a custom basis. Hold time for the Dewars before required replenishments can be optimized to maximize such hold time while maintaining a reasonable size profile for the overall system. Technologies developed by the space programs in the U.S. and Russia are now available commercially to help with this task.

A second alternative is the use of an "open cycle" refrigerator which uses compressed gases (typically helium) and a special cryocooling device (e.g., a Joule-Thomson device). This arrangement provides for rapid cooldown in platforms where the operating period of the device is short. Longer operating times can be obtained by simply using a larger volume of compressed gas.

A third cooling alternative is the use of a closed cycle refrigerator (CCR). This alternative is preferred in applications requiring "turn-key" operation and long-intervals between periodic maintenance or in some cases no periodic maintenance. These systems are available commercially and custom systems conforming to particular requirements can be developed by contract with one or more manufacturers.

Cryopackaging of the ADC and correlator can thus be readily accomplished using a combination of off-the-shelf components and appropriate adaptors and interfaces that can be engineered and implemented by the user or the system manufacturer.

Figure 28:
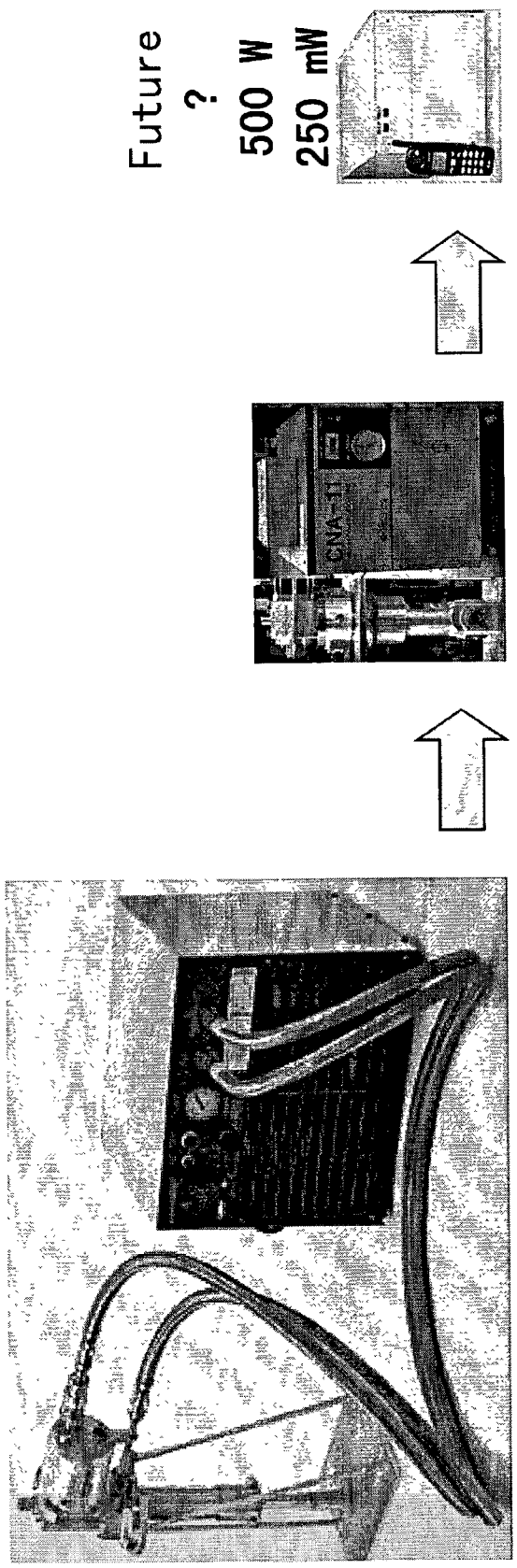
FIG. 28 shows the development of commercial cryo-cooler technology.

FIG. 28 shows the developmental progression of commercial cryocoolers for small digital systems. At the far left is an example of: Leybold 4.2LAB, Input: 2.2 kW, Heat Lift @4.2K: 250 mW. This type of system has been used in the past. Current technology at the time of this writing is shown in the center portion of the figure. Pictured is a Sumitomo SRDKO101, Input: 1.3 kW, Heat Lift @4.2K: 100 mW. In the future at the far right of the figure—we expect to see further miniaturization.

Figure 29:
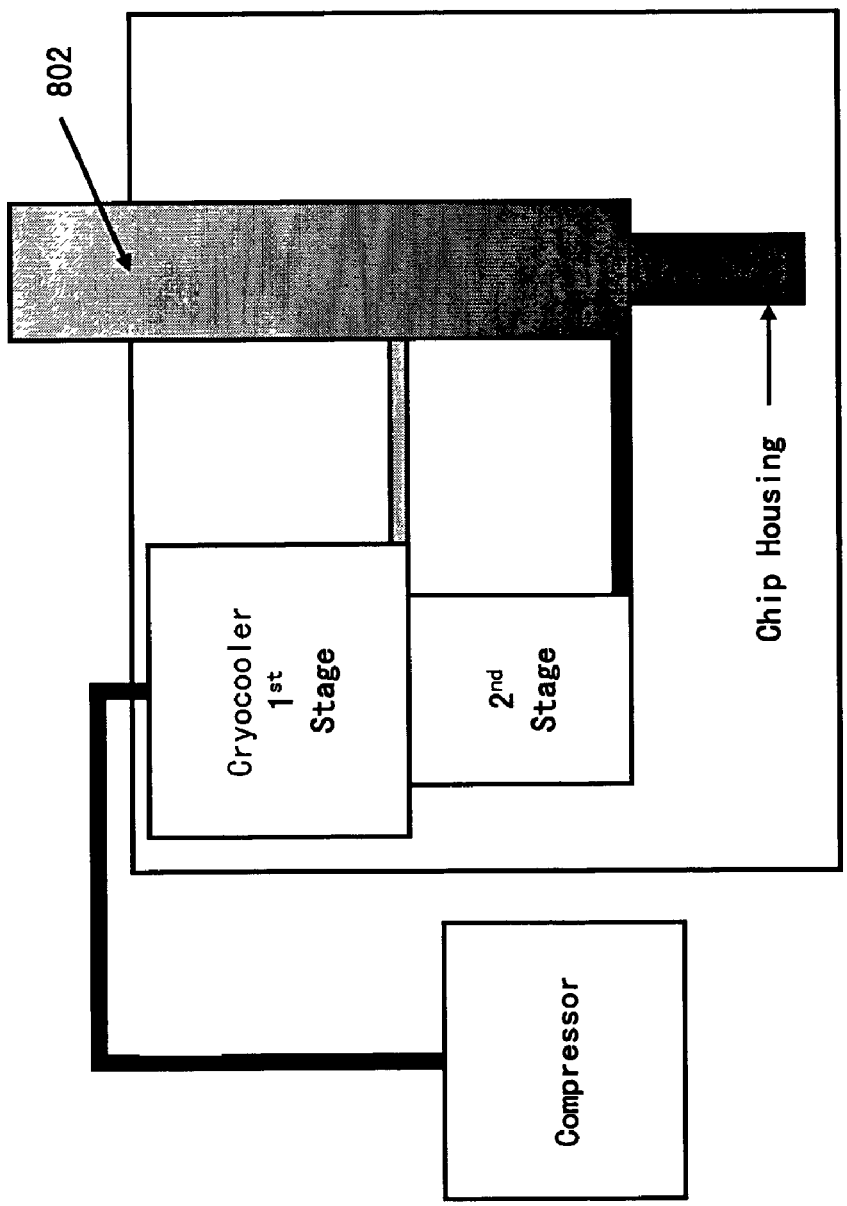
FIG. 29 is a schematic diagram of a cryo-cooler having a dual mode probe.

FIG. 29 is a schematic diagram of a cryo-cooler having a dual mode probe 802. A dual mode probe can be used in liquid He and attached to a cryocooler with detachable thermal links. The IC is positioned within the dual mode probe.

Figure 30:
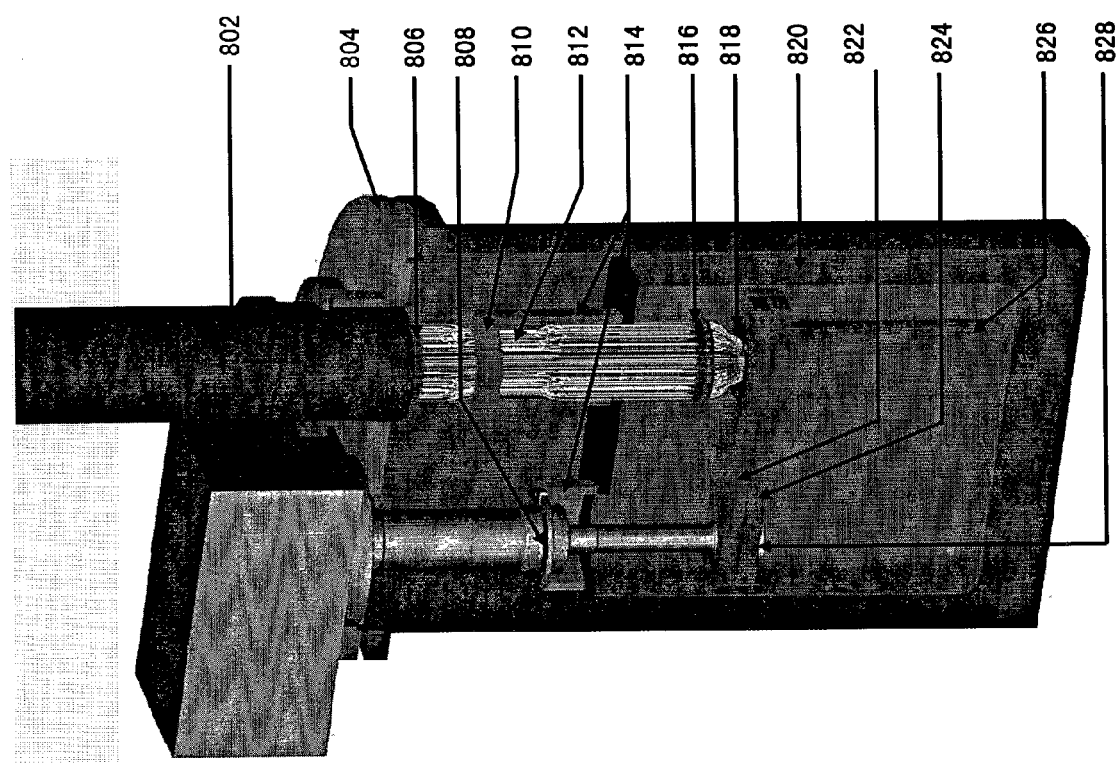
FIG. 30 is a cut away view of a cryopackage.

FIG. 30 is an example of a cryopackage 800 in cut away view. A dual mode probe 802 contains the custom fabricated IC. It can be used in liquid He and attached to a cryocooler with detachable thermal links. The following reference numerals refer to parts of cryopackage 800: 802—dual mode cryoprobe, 804—vacuum cryostat, 806—cable connectors, 808—cryocooler 1st stage, 810—cryoprobe 1st stage, 812—stainless steel coax, 814—1st stage interconnect, 816—cable connectors, 818—cryoprobe 2nd stage, 820—ratiation shield, 822—2nd stage interconnect 1 (thermal anchoring of cables), 824—2nd stage interconnect 2 (thermal anchoring of chip housing), 826—chip housing and 828—cryocooler 2nd stage.

Figure 31:
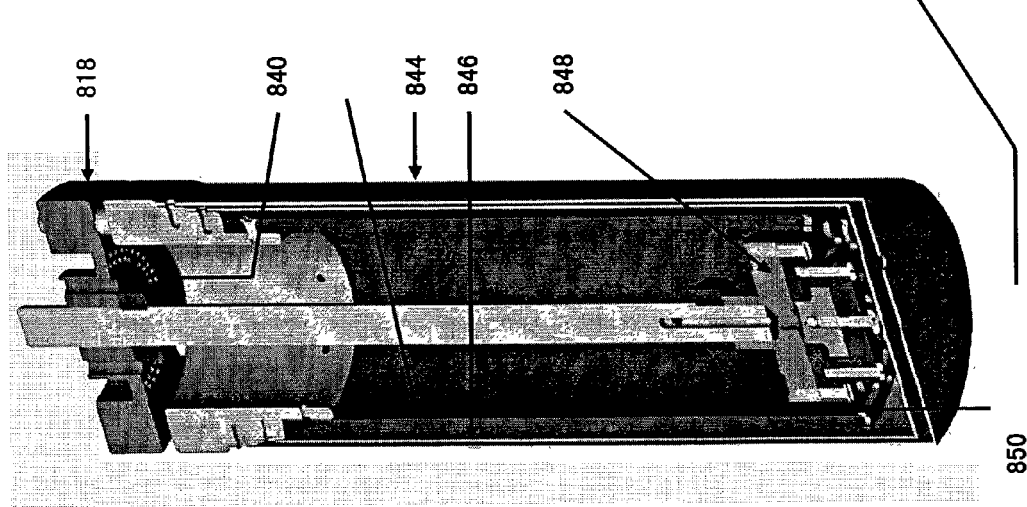
FIG. 31 shows cut away and expanded views of a chip housing.

FIG. 31 is a cut away view of a portion of cryoprobe 902. The reference numerals refer as follows to: 818—cryoprobe 2nd stage (see FIG. 30), 840—coax holes, 842—conduction cylinder, 844—magnetic shield outer, 846—magnetic shield inner, 848—coax grounding block, 850—flexible plate.

FIG. 32 is an expanded view of the chip housing 826 (see FIG. 30). The reference numerals refer as follows to: 852—support bridge, 854—chip block (integrated with flexible plate), 856—torque screw for pressure contact, and 858—LTS Chip.

Figure 33:
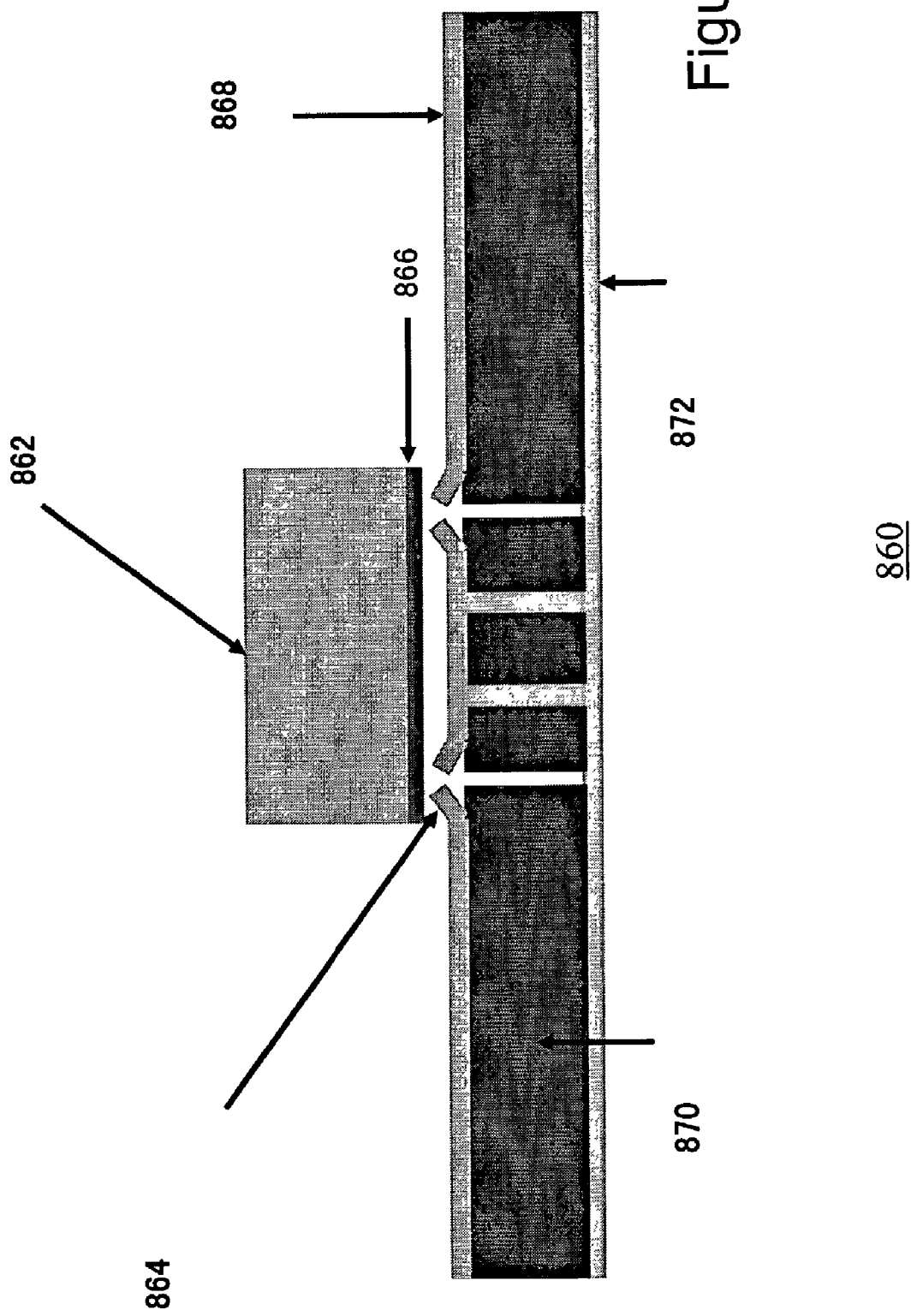
FIG. 33 shows a cut away side view of a chip interface.

FIG. 33 is a cut away side view of a chip interface, generally indicated by reference numeral 860. Reference numerals refer as follows to: 862—copper block for thermal exchange with second stage of cryocooler, 864—spring fingers electrodes, 866—IC chip, 868—gold plated beryllium copper, 870—Kapton dielectric for 50 ohm microstrip, and 872—copper ground plane.

In the various receiver arrangements described above, the reference digital waveform can be made to represent hopping template for matching a hopping pattern of a transmitted waveform so as to provide digital dehopping.

Other arrangements and configurations are possible given the teachings set forth herein. The claims are not meant to be limited to the specific embodiments described.

What is claimed is:

1. A digital correlator operational at RF (radio frequencies), comprising:
    a multiplier having first and second inputs and an output providing an output signal that represents a multiplication of signals coupled to the first and second inputs;
    means for applying a digital signal at RF frequencies to the first input of the multiplier;
    means for applying a reference digital waveform to the second input of the multiplier;
    a counter having an input coupled to receive the output of the multiplier and an output for providing an accumulated count over a programmed period of time; and
    a decision circuit coupled to the output of the counter for receiving the accumulated count and determining the status of data bits therefrom.

2. A correlator according to claim 1 wherein the means for applying a digital signal at RF frequencies to the first input of the multiplier includes means for receiving broadband radio-frequency (RF) signals and an analog to digital (A/D) converter coupled to said receiving means capable of operating at RF frequencies for receiving said RF signals including a signal of interest, sampling it, and providing a stream of digital data representing the analog signal which is applied to said first input;
    wherein the A/D converter, the multiplier, the counter and the decision circuit are fabricated from superconducting logic elements, and
    wherein the superconductor logic elements are single flux quantum (SFQ) logic elements.

3. A correlator according to claim 1 wherein the multiplier is constituted by a single flux quantum (SFQ) exclusive-or (XOR) gate.

4. A correlator according to claim 2 wherein the multiplier is constructed and arranged to receive a 1-bit data stream and wherein there is included a cryocooler arrangement for cooling the A/D converter, the multiplier, the counter and the decision circuit.

5. A correlator according to claim 1 wherein the multiplier is constructed and arranged to receive a multi-bit data stream.

6. A correlator according to claim 1 wherein the RF frequencies are in the range of 100 MHz.–50 GHz.

7. A correlator according to claim 6 wherein the RF frequencies are in the range of 100 MHz.–5 GHz.

8. A correlator according to claim 1 wherein the multiplier is a 1-bit multiplier.

9. A correlator according to claim 1 wherein the multiplier is an nxm bit multiplier.

10. A correlator according to claim 1 wherein the multiplier is a kx1 bit multiplier.

11. A correlator according to claim 1 wherein the reference waveform is a square wave.

12. A correlator according to claim 1 wherein the reference waveform represents a sine wave.

13. A correlator according to claim 1 wherein the reference waveform represents a frequency hopping pattern matching a transmitted waveform.

14. A combination comprising:
    means for receiving broadband radio-frequency (RF) analog signals;
    an analog to digital (A/D) converter directly coupled to said receiving means operable at RF frequencies for receiving said RF analog signals including a signal of interest, sampling it, and providing a stream of digital data representing the analog signal; and
    an RF digital correlator constructed and arranged to receive the stream of digital data from the A/D converter for correlating the digital data stream with a locally generated template and providing a digital signal indicative of the signal of interest.

15. A combination as claimed in claim 14 wherein the RF digital correlator includes:
    a multiplier having first and second inputs and an output providing an output signal that represents a multiplication of signals coupled to the first and second inputs, the first input being adapted to receive a digital signal at RF frequencies and the second input being adapted to receive a reference digital waveform;
    a counter having an input coupled to receive the output of the multiplier and an output for providing an accumulated count over a predetermined period of time; and
    a decision circuit coupled to the output of the counter for receiving the accumulated count and determining the status of data bits therefrom;
    wherein said A/D converter, said multiplier, said counter and said decision circuit are fabricated using superconducting logic elements; and
    wherein the data stream from the A/D converter is at least a 1-bit data stream.

16. A combination as claimed in claim 15 wherein the data stream from the A/D converter is a multi-bit data stream.

17. A combination as claimed in claim 15 wherein said multiplier includes an exclusive-or (XOR) gate having a first input for receiving an output of the A/D converter and having a second input for receiving a reference signal corresponding to the locally generated template for XORing the two input signals; and a digital filter for filtering the output of the XOR gate to provide an output.

18. A combination as claimed in claim 17 wherein said A/D converter is a delta modulator.

19. A combination as claimed in claim 14 wherein the A/D converter is a delta A/D converter.

20. A combination to claim 14 wherein the A/D converter is a delta-sigma (also known as sigma-delta) A/D converter.

21. A combination according to claim 14 wherein the reference waveform is a square wave.

22. A combination according to claim 14 wherein the reference waveform represents a sine wave.

23. A combination according to claim 14 wherein the reference waveform represents a frequency hopping pattern matching a transmitted waveform.

24. A combination as claimed in claim 14 further including:
   means for replicating the digital data stream output from the ADC whereby there is provided first and second like streams of digital data representing the analog signals; and
   wherein said RF digital correlator is adapted to receive said first stream of digital data and including a second RF digital correlator adapted to receive said second stream of digital data and wherein said first and second RF digital correlators are correlator based digital signal processors (CBDSP), each being constructed and arranged to compare its digital data stream with one or more reference digital data stream templates for providing correlation information resulting therefrom.

25. A combination as claimed in claim 14 wherein:
   said A/D converter is a wideband analog to digital modulator (ADM) constructed and arranged to receive an RF signal including a signal having several frequency bands of interest to be detected and provide a digital data stream output; and
   further including means for replicating the digital data stream output from the ADM; and
   wherein said RF digital correlator is adapted to receive said first stream of digital data and including a second RF digital correlator adapted to receive said second stream of digital data and wherein said first and second RF digital correlators are RF correlator based digital mixer and filters (DMF), each being constructed and arranged to compare the digital data stream with one or more reference digital data stream templates for providing correlation information resulting therefrom.

26. A combination as claimed in claim 14 wherein said RF digital correlator is a first RF digital correlator and further including a second and a third RF digital correlator, each correlator having a first input for receiving signals corresponding to the stream of digital data produced at the output of the A/D converter; and
   said first, second and third RF digital correlators also being denoted as cross correlators.

27. A front end as claimed in claim 26 further including;
   means for generating a digital reference waveform;
   a digital true time delay for delaying the digital reference waveform in accordance with a time-based synchronization signal from the third digital RF cross correlator and provide a time delayed reference waveform;
   a variable phase delay coupled to receive the time delayed reference waveform and provide it with a controlled delay to the first digital RF cross correlator;
   means for providing the time delayed reference waveform to the second digital RF cross correlator; and
   means for controlling the delay of the variable phase delay to achieve synchronization.

28. A combination as claimed in claim 14 wherein said digital RF correlator includes first and second latches and wherein said multiplier is connected in circuit between the first and second latches, the first latch receiving the sampled data stream from the output of the A/D converter, and the second latch receiving a reference digital waveform generated by a digital waveform synthesizer; the multiplier providing a multiplier output indicative of the multiplication of signals latched by the first and second latches.

29. A combination as claimed in claim 28 further including:
   a chip counter constructed and arranged to receive the multiplier output and provide a count output;
   a symbol counter constructed and arranged to receive the count output and provide in response thereto a symbol count;
   a decision circuit constructed and arranged to receive an output of the chip counter and provide in response thereto a chip output; and
   a fuzzy decision circuit constructed and arranged to receive the symbol count and provide in response thereto a symbol output.

30. A combination as claimed in claim 14 wherein said digital RF correlator is an an in phase correlator; and further including a quadrature correlator; and wherein said locally generated template includes a reference signal generator constructed and arranged to apply the same reference template signal to both the in phase and quadrature correlators with 0° and 90° phase shift respectively; and further including means for monitoring the output of the quadrature correlator; including; (a) means, if the output of the quadrature correlator is within uncorrelated bounds, for determining that there is time synchronization of the correlators; and (b) means, if the output of the quadrature correlator is not within uncorrelated bounds, for adjusting a phase difference between the correlators until the output of the quadrature correlator is again within uncorrelated bounds.

31. An RF receiver, comprising:
   means for receiving broadband radio-frequency (RF) analog signals;
   a wideband analog to digital converter (ADC), directly coupled to said RF receiving means, constructed and arranged to receive said RF signals including a signal of interest to be detected and provide a digital data stream output;
   means for replicating the digital data stream output from the ADC; and
   two or more RF correlators based digital signal processors (CBDSP), each being constructed and arranged to compare the digital data stream with one or more reference digital data stream templates and providing correlation information resulting therefrom.

32. A receiver according to claim 31 wherein at least one reference digital data stream is a square wave.

33. A receiver according to claim 31 wherein at least one reference digital data stream is a triangular wave.

34. A receiver according to claim 31 wherein at least one reference digital data stream is a sine wave.

35. A receiver according to claim 31 wherein the reference digital data stream is a hopping template for matching a hopping pattern of a transmitted waveform so as to provide digital dehopping.

36. A receiver according to claim 31 wherein at least one of the at least one CBDSP is a correlator.

37. A receiver according to claim 31 wherein at least one of the at least one CBDSP is a cross-correlator.

38. An RF receiver, comprising:
   means for receiving broadband radio-frequency (RF) analog signals; a wideband analog to digital modulator (ADM), directly coupled to said RF receiving means, constructed and arranged to receive said RF signals including a signal having several frequency bands of interest to be detected and provide a digital data stream output;
   means for replicating the digital data stream output from the ADM; and
   two or more RF correlator based digital mixer and filters (DMF), each being constructed and arranged to compare the digital data stream with one or more reference digital data stream templates and providing correlation information resulting therefrom.

39. A receiver according to claim 38 wherein at least one reference digital data stream is a square wave.

40. A receiver according to claim 38 wherein at least one reference digital data stream is a triangular wave.

41. A receiver according to claim 38 wherein the reference digital data stream is a hopping template for matching a hopping pattern of a transmitted waveform so as to provide digital dehopping.

42. A receiver according to claim 38 wherein at least one reference digital data stream is a sine wave.

43. A receiver according to claim 38 wherein at least one of the DMFs comprises:
   a digital local oscillator providing a local oscillator (LO) signal;
   a first XOR gate XORing an output of the ADM with a signal from the digital local oscillator;
   phase shifter for shifting the phase of the LO signal to provide a phase shifted LO signal;
   a second XOR gate for XORing the output of the ADM with the phase shifted LO signal;
   a first programmable digital filter (PDF) for filtering the output of the first XOR gate and providing an "I" output signal;
   a second PDF for filtering the output of the second XOR gate and providing a "Q" output signal; and
   a controller for controlling operation of the digital local oscillator, and both PDFs.

44. A receiver configuration, comprising:
   means for receiving a sampled RF signal;
   a first digital RF cross correlator adapted to receive the sampled RF signal;
   a second digital RF cross correlator adapted to receive the sampled RF signal;
   a third digital RF cross correlator adapted to receive the sampled RF signal;
   means for generating a digital reference waveform;
   a digital true time delay for delaying the digital reference waveform in accordance with a time-based synchronization signal from the third digital RF cross correlator and provide a time delayed reference waveform;
   a variable phase delay coupled to receive the time delayed reference waveform and provide it with a controlled delay to the first digital RF cross correlator;
   means for providing the time delayed reference waveform to the second digital RF cross correlator; and
   means for controlling the delay of the variable phase delay to achieve synchronization.

45. A receiver according to claim 44 wherein the variable phase delay delays in controllable increments of a clock period.

46. A receiver according to claim 45 wherein the clock period is 50 ps.

47. A receiver according to claim 44 wherein the reference digital waveform is a square wave.

48. A receiver according to claim 44 wherein the reference digital waveform is a sine wave.

49. A receiver according to claim 44 wherein the reference digital waveform is a hopping template for matching a hopping pattern of a transmitted waveform so as to provide digital dehopping.

50. A receiver configuration, comprising:
   an analog to digital converter (ADC) for sampling an input RF signal and providing a sampled digital data stream;
   a first digital RF correlator adapted to receive the sampled RF signal and provide a digital filter output;
   a second digital RF correlator adapted to receive the sampled RF signal;
   means for generating a digital reference waveform;
   a variable delay coupled to receive the digital reference waveform and provide it to the first and second digital RF correlators;
   a phase shifter for shifting the phase of the output of the variable delay before it is provided to the second digital RF correlator; and
   means for controlling the delay of the variable phase delay to achieve synchronization.

51. A receiver according to claim 50 wherein the reference digital waveform is a square wave.

52. A receiver according to claim 50 wherein the reference digital waveform is a sine wave.

53. A receiver according to claim 50 wherein the reference digital waveform is a hopping template for matching a hopping pattern of a transmitted waveform so as to provide digital dehopping.

54. A receiver configuration, comprising:
   a phase modulation analca to digital converter comprising a delta modulator having an input adapted to receive an input RF signal and having an output for producing thereat a 1-bit oversamPled digital pulse train representation of the RF input;
   a reference signal generator for generating a 1-bit oversampled reference signal;
   an XOR gate having an input for receiving said output of the delta modulator and said reference signal for multiplying (XORing) the digital representation of the RF input with the reference signal; and said XOR gate having an output at which the multiplied output is produced; and
   a digital filter for filtering the output of the XOR gate to provide a receiver output.

55. A receiver according to claim 54 wherein the reference signal is a square wave.

56. A receiver according to claim 54 wherein the reference digital waveform is a hopping template for matching a hopping pattern of a transmitted waveform so as to provide digital dehopping.

57. A receiver according to claim 54 wherein the digital filter is a decimation filter.

58. A receiver arrangement comprising:
   a band pass ADC front end configured and arranged to receive an input RF signal and providing a sampled data stream;
   a digital RF correlator including first and second latches and a multiplier in circuit between the first and second latches, the first latch receiving the sampled data stream, the multiplier providing a multiplier output indicative of the multiplication of signals latched by the first and second latches;
   a digital waveform synthesizer for providing a reference digital waveform to the second latch;
   a chip counter constructed and arranged to receive the multiplier output and provide a count output;
   a symbol counter constructed and arranged to receive the count output and provide in response thereto a symbol count;
   a decision circuit constructed and arranged to receive an output of the chip counter and provide in response thereto a chip output; and a fuzzy decision circuit constructed and arranged to receive the symbol count and provide in response thereto a symbol output.

59. A receiver according to claim 58 wherein the reference digital waveform is a square wave.

60. A receiver according to claim 58 wherein the reference digital waveform is a hopping template for matching a hopping pattern of a transmitted waveform so as to provide digital dehopping.

61. A receiver arrangement comprising:
a band pass ADC front end configured and arranged to receive an input RF signal and providing a sampled data stream;
a first digital RF correlator constructed and arranged to provide for demodulation, the first RF correlator including:
a first latch,
a second latch,
a multiplier in circuit between the first and second latches, the first latch receiving the sampled data stream and being clocked by the clock signal, the multiplier providing a multiplier output indicative of the multiplication of signals latched by the first and second latches,
a chip counter constructed and arranged to receive an output of the multiplier,
a decision circuit receiving an output of the chip counter and providing a chip output; and
a chip counter constructed and arranged to receive the multiplier output and provide a count output;
a circular shift register constructed and arranged to provide a reference digital waveform to the second latch;
a second digital correlator constructed and arranged to correlate the chip output from the decision circuit of the first correlator with digital data chips and perform a ombination function providing a symbol output.

62. A receiver according to claim 61 wherein the circular shift register provides a plurality of reference digital waveforms in sequence to the second latch.

63. A receiver according to claim 61 wherein the reference digital waveform is a hopping template for matching a hopping pattern of a transmitted waveform so as to provide digital dehopping.

64. A method for time synchronizing a correlation based receiver, comprising:
applying the same reference template signal to both in phase and quadrature correlators with 0° and 90° phase shift respectively;
monitoring the output of the quadrature correlator;
if the output of the quadrature correlator is within uncorrelated bounds, determining that there is time synchronization of the correlators;
if the output of the quadrature correlator is not within uncorrelated bounds, adjusting a phase difference between the correlators until the output of the quadrature correlator is again within uncorrelated bounds.

65. A receiver arrangement, comprising:
an in phase correlator;
a quadrature correlator;
a reference signal generator constructed and arranged to apply the same reference template signal to both the in phase and quadrature correlators with 0° and 90° phase shift respectively;
means for monitoring the output of the quadrature correlator;
means, if the output of the quadrature correlator is within uncorrelated bounds, for determining that there is time synchronization of the correlators;
means, if the output of the quadrature correlator is not within uncorrelated bounds, for adjusting a phase difference between the correlators until the output of the quadrature correlator is again within uncorrelated bounds.

* * * * *